United States Patent
Sakai et al.

(10) Patent No.: US 10,371,817 B2
(45) Date of Patent: *Aug. 6, 2019

(54) OBJECT DETECTING APPARATUS

(71) Applicant: Ricoh Company, Ltd., Tokyo (JP)

(72) Inventors: Kohji Sakai, Tokyo (JP); Tadashi Nakamura, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/001,710

(22) Filed: Jun. 6, 2018

(65) Prior Publication Data

US 2018/0284270 A1  Oct. 4, 2018

Related U.S. Application Data

(63) Continuation of application No. 14/523,042, filed on Oct. 24, 2014, now Pat. No. 10,031,228.

(30) Foreign Application Priority Data

Nov. 5, 2013 (JP) .................................. 2013-229222
Feb. 28, 2014 (JP) .................................. 2014-038590

(51) Int. Cl.
*G01C 3/08* (2006.01)
*G01S 17/02* (2006.01)
(Continued)

(52) U.S. Cl.
CPC ............ *G01S 17/026* (2013.01); *G01S 7/484* (2013.01); *G01S 7/4815* (2013.01);
(Continued)

(58) Field of Classification Search
CPC ...... G01S 7/4816; G01S 7/4817; G01S 7/484; G01S 7/4815; G06K 9/00805; G06K 9/2036; G08G 1/166; G08G 1/165
(Continued)

(56) References Cited

U.S. PATENT DOCUMENTS 4,927,263 A    5/1990  De Groot
5,552,893 A *  9/1996  Akasu ..................... G01C 3/00
                                                  356/4.01

(Continued)

FOREIGN PATENT DOCUMENTS

JP    5-232226 A    9/1993
JP    7-84045 A     3/1995
(Continued)

OTHER PUBLICATIONS

Office Action dated Aug. 1, 2018 in Japanese Patent Application No. 2014-038590.
(Continued)

*Primary Examiner* — Mark Hellner
(74) *Attorney, Agent, or Firm* — Oblon, McClelland, Maier & Neustadt, L.L.P.

(57) ABSTRACT

An object detecting apparatus includes: a light projection unit that is an array light source in which each of a plurality of light emission areas emits light, an optical scanning unit that performs scanning with the light, which is emitted from the light projection unit, in a first direction, and a light receiving unit that receives reflected light which is the light, with which the scanning is performed, being reflected by an object, and an object information acquiring unit that detects presence/absence of the object based on emission timing at which the light is emitted from the light projection unit and light receiving timing at which the light receiving unit receives the reflected light.

17 Claims, 22 Drawing Sheets

(51) Int. Cl.
- *G01S 17/42* (2006.01)
- *G01S 17/58* (2006.01)
- *G01S 17/93* (2006.01)
- *G01S 7/481* (2006.01)
- *G01S 7/484* (2006.01)
- *G06K 9/00* (2006.01)
- *G06K 9/20* (2006.01)
- *G08G 1/16* (2006.01)

(52) U.S. Cl.
CPC ......... *G01S 7/4816* (2013.01); *G01S 7/4817* (2013.01); *G01S 17/42* (2013.01); *G01S 17/58* (2013.01); *G01S 17/936* (2013.01); *G06K 9/00805* (2013.01); *G06K 9/2036* (2013.01); *G08G 1/165* (2013.01); *G08G 1/166* (2013.01)

(58) Field of Classification Search
USPC ....................................................... 356/4.01
See application file for complete search history.

(56) References Cited

U.S. PATENT DOCUMENTS

| | | | |
|---|---|---|---|
| 5,726,647 A | 3/1998 | Waffler | |
| 5,864,391 A | 1/1999 | Hosokawa | |
| 6,038,496 A | 3/2000 | Dobler | |
| 6,671,037 B2 | 12/2003 | Isogai | |
| 7,349,074 B2 | 3/2008 | Zambon | |
| 10,031,228 B2 * | 7/2018 | Sakai | G01S 17/026 |
| 2009/0034002 A1 | 2/2009 | Shibaki | |
| 2014/0009747 A1 | 1/2014 | Suzuki | |
| 2014/0034817 A1 | 2/2014 | Nakamura | |
| 2014/0036071 A1 | 2/2014 | Nakamura | |
| 2014/0209793 A1 | 7/2014 | Nakamura | |
| 2015/0006030 A1 | 1/2015 | Bennett | |
| 2015/0124238 A1 | 5/2015 | Sakai | |
| 2015/0160341 A1 | 6/2015 | Akatsu | |
| 2015/0204977 A1 | 7/2015 | Sakai | |
| 2015/0268332 A1 | 9/2015 | Nakamura | |
| 2015/0268343 A1 | 9/2015 | Uehira | |

FOREIGN PATENT DOCUMENTS

| | | |
|---|---|---|
| JP | 2-894055 | 3/1999 |
| JP | 3-446466 | 7/2003 |
| JP | 2009-037283 | 2/2009 |
| JP | 2010-48662 A | 3/2010 |
| JP | 2010-096574 | 4/2010 |
| JP | 2013-130531 A | 7/2013 |
| JP | 2014-020889 | 2/2014 |
| JP | 2014-029317 | 2/2014 |
| JP | 2014-032149 | 2/2014 |
| JP | 2014-145744 | 8/2014 |
| JP | 2014-232265 A | 12/2014 |
| JP | 2014-235075 A | 12/2014 |
| JP | 2015-111090 A | 6/2015 |
| JP | 2015-129734 A | 7/2015 |
| JP | 2015-137951 A | 7/2015 |
| JP | 2015-178975 A | 10/2015 |
| JP | 2015-178976 A | 10/2015 |

OTHER PUBLICATIONS

Office Action issued in Japanese Patent Application No. 2014-038590 dated Dec. 20, 2017.

* cited by examiner

OBJECT DETECTING APPARATUS

CROSS-REFERENCE TO RELATED APPLICATIONS

The present application is a continuation of U.S. patent application Ser. No. 14/523,042 filed Oct. 24, 2014, which claims priority to Japanese Patent Application No. 2013-229222 filed in Japan on Nov. 5, 2013 and Japanese Patent Application No. 2014-038590 filed in Japan on Feb. 28, 2014, the entire contents of each of which is incorporated herein by reference.

BACKGROUND OF THE INVENTION

1. Field of the Invention

The present invention relates to an object detecting apparatus with which an object is detected.

2. Description of the Related Art

Recently, an object detecting apparatus to detect presence/absence of an object or a distance to an object has been known. Object detecting apparatuses of various structures have been known.

For example, an object detecting apparatus which performs two-dimensional scanning with a laser beam, selects only a reflected laser beam reflected by a detection object, and acquires distance information related to the detection object based on timing of projecting the laser beam and timing of receiving the reflected laser beam has been known (see, for example, JP 2010-096574 A).

Also, an object detecting apparatus which divides a visual field region, which is forward in a vehicle moving direction, in a right-left direction and performs, for example, presence/absence determination of an obstacle in each of the divided visual field regions when performing presence/absence determination of an obstacle, distance determination, or the like based on a reflected light of a laser beam emitted to the visual field region has been known (see, for example, JP 2894055 B1).

Also, an object detecting apparatus including a rotary polygon mirror, which includes a plurality of reflection surfaces tilt angles of which toward a rotary shaft are different from each other, and a light receiving unit to receive a reflected light of a pulsed light emitted to a forward measurement area from the reflection surfaces has been known (see, for example, JP 3446466 B1).

In an object detecting apparatus, by dividing a visual field region in an up-down direction (vertical direction) when information related to an "object in a short detection distance" and an "object in a long detection distance" is acquired, detection accuracy can be improved.

However, in an object detecting apparatus of each patent literature described above, it is difficult to divide a visual field region in an up-down direction (vertical direction) and to improve resolution of the detection region.

Therefore, there is a need for an object detecting apparatus which can improve resolution of a detection region by dividing a visual field region in an up-down direction (vertical direction).

SUMMARY OF THE INVENTION

It is an object of the present invention to at least partially solve the problems in the conventional technology.

The present invention provides an object detecting apparatus that includes a light projection unit that is an array light source in which each of a plurality of light emission areas emits light; an optical scanning unit that performs scanning with the light, which is emitted from the light projection unit, in a first direction; and a light receiving unit that receives reflected light which is the light, with which the scanning is performed, being reflected by an object; and an object information acquiring unit that detects presence/absence of the object based on emission timing at which the light is emitted from the light projection unit and light receiving timing at which the light receiving unit receives the reflected light. The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

In the following, an embodiment of an object detecting apparatus according to the present invention will be described with reference to the drawings.

Embodiment of Monitoring Apparatus Including Object Detecting Apparatus

Figure 1:
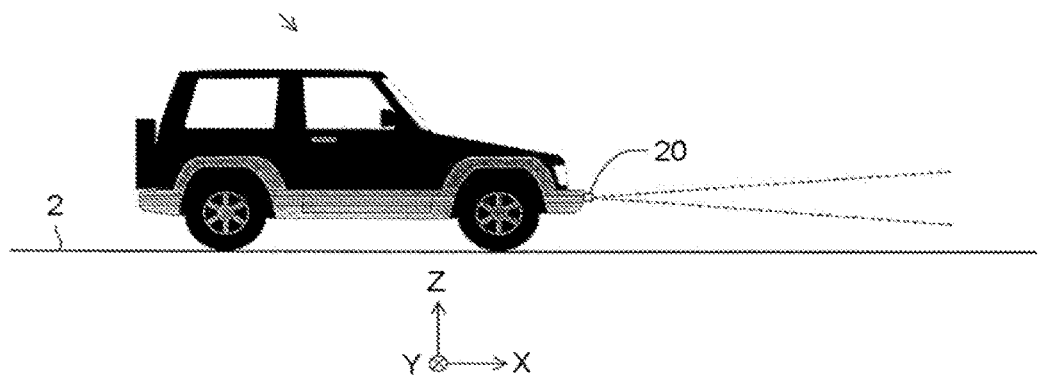
FIG. 1 is a schematic view of a vehicle mounting a laser radar which is an embodiment of an object detecting apparatus according to the present invention.

FIG. 1 is a schematic view of a vehicle 1 mounting a laser radar 20 which is an embodiment of an object detecting apparatus according to the present invention. As illustrated in FIG. 1, the laser radar 20 is attached, for example, near a license plate in the front of the vehicle 1. From the laser radar 20 attached to the front of the vehicle 1, light is emitted forward of the vehicle 1. By the light, for example, detection of an object 100 (not illustrated in FIG. 1) which may be in front of the vehicle 1 or measurement of a distance to the object 100 is performed.

First, a three-dimensional orthogonal coordinate system used for description of the following embodiment will be described with reference to FIG. 1. As illustrated in FIG. 1, an irradiation surface of light (laser beam) emitted from the laser radar 20 attached to the front of the vehicle 1 becomes orthogonal to a road surface 2. A direction orthogonal to the road surface 2 (up-down direction on plane of paper) is assumed as a Z-axis direction. Also, a direction which is a forward direction (right direction on plane of paper) of the vehicle 1 and is orthogonal to the Z-axis direction is assumed as an X-axis direction. Also, a direction (depth direction on plane of paper) orthogonal to the Z-axis and the X-axis is assumed as a Y-axis direction. Note that the forward direction of the vehicle 1 (right direction on plane of paper) is assumed as a "+X direction".

Embodiment of Monitoring Apparatus

Figure 2:
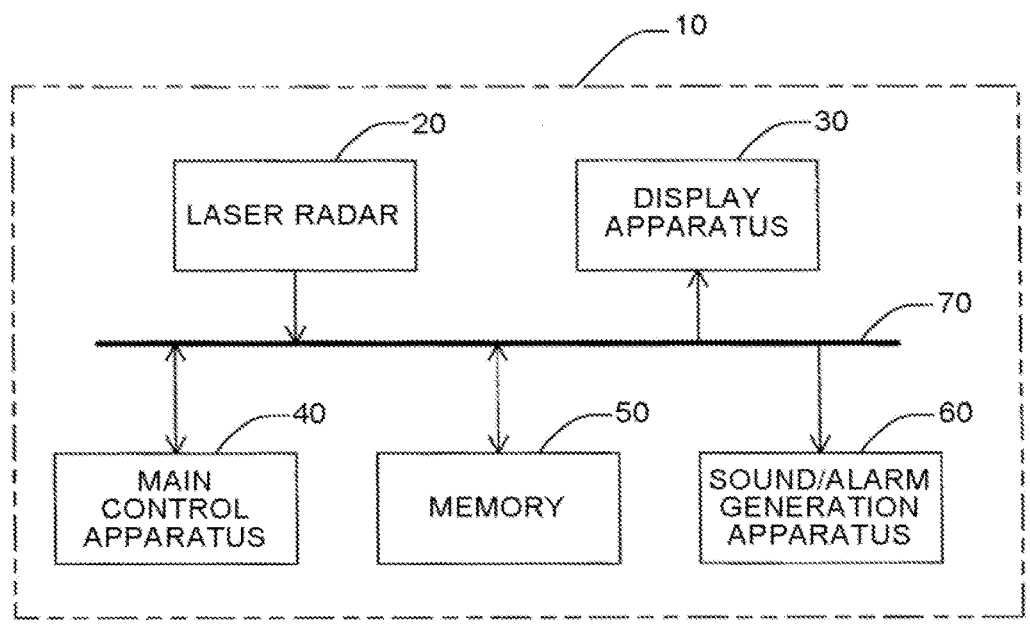
FIG. 2 is a configuration diagram illustrating a configuration example of a monitoring apparatus including the laser radar.

Next, a monitoring apparatus 10 including the laser radar 20 will be described. The monitoring apparatus 10 is, for example, a sensing apparatus mounted in the vehicle 1. A part of the monitoring apparatus 10 is attached to an inner part of the vehicle 1 and the laser radar 20 is attached to an outer part of the vehicle 1. FIG. 2 is a configuration diagram illustrating a configuration example of the monitoring apparatus 10 including the laser radar 20. As illustrated in FIG. 2, the monitoring apparatus 10 includes the laser radar 20, a display apparatus 30, a main control apparatus 40, a memory 50, and a sound/alarm generation apparatus 60. Apparatuses included in the monitoring apparatus 10 are connected to each other in a manner mutually communicable through a bus 70 for data transmission.

The display apparatus 30 is a display unit to display object information or movement information calculated by calculation processing executed in the main control apparatus 40.

The main control apparatus 40 acquires whether there is movement of the object 100 in front of the vehicle 1 based on "object information" or the like stored in the memory 50 which will be described later. Also, when the object 100 is moving, the main control apparatus 40 acquires "movement information" including a moving direction and a moving speed of the object 100. Also, the main control apparatus 40 outputs alarm information based on the object information and the movement information. The alarm information is output when it is determined, based on the object information or the like, that "there is a danger" by calculation processing executed in the main control apparatus 40.

The memory 50 is a storage unit to store "object information" acquired by object information acquiring processing executed by the laser radar 20.

The sound/alarm generation apparatus 60 outputs sound or an alarm signal according to the alarm information, which is output by the main control apparatus 40 based on the object information and the movement information, and call attention around the vehicle 1.

Figure 36:
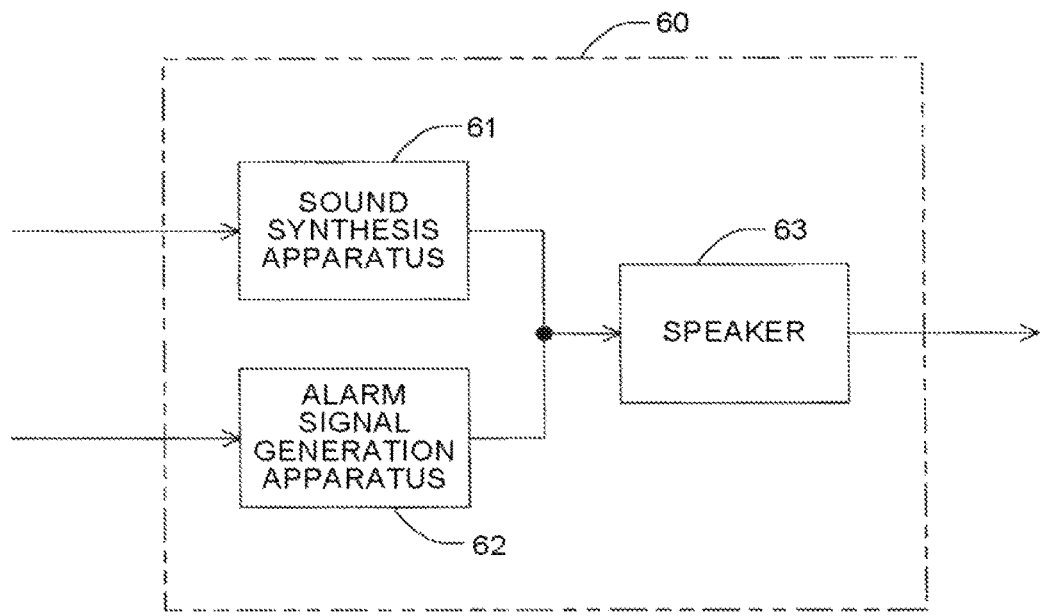
FIG. 36 is a configuration diagram illustrating an example of a configuration of a sound/alarm generation apparatus included in the monitoring apparatus.

FIG. 36 is a configuration diagram illustrating an example of a configuration of the sound/alarm generation apparatus 60. As illustrated in FIG. 36, the sound/alarm generation apparatus 60 includes a sound synthesis apparatus 61, an alarm signal generation apparatus 62, and a speaker 63.

The sound synthesis apparatus 61 is a sound output apparatus which includes a plurality of pieces of sound data, selects sound data corresponding to the alarm information input from the main control apparatus 40, and outputs the selected sound data to the speaker 63.

The alarm signal generation apparatus 62 is an alarm output apparatus which generates an alarm signal corresponding to the alarm information input from the main control apparatus 40 and outputs the generated alarm signal to the speaker 63.

Configuration Example of Laser Radar 20

Figure 3:
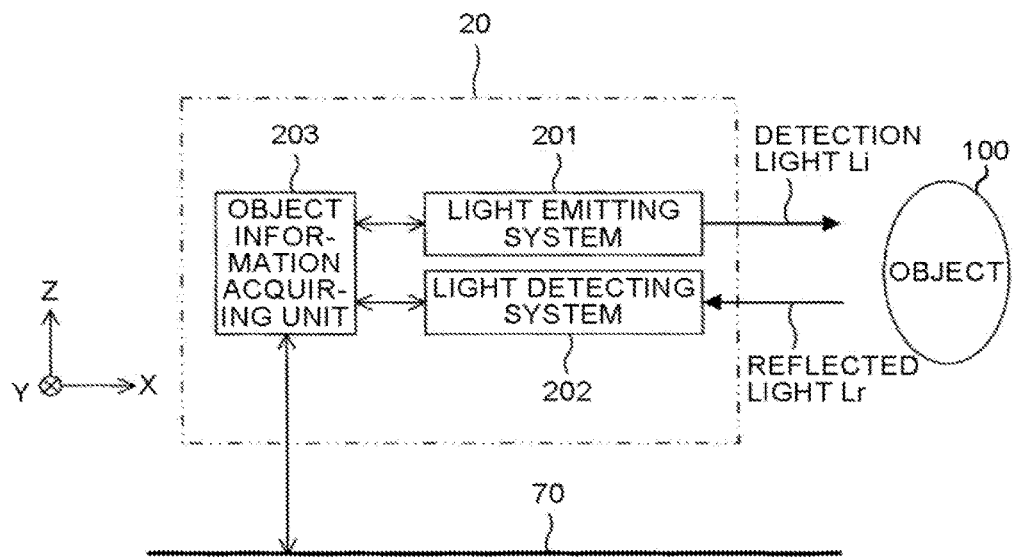
FIG. 3 is a configuration diagram illustrating a configuration example of the laser radar.

Next, a detail configuration of the laser radar 20 will be described. FIG. 3 is a configuration diagram illustrating a configuration example of the laser radar 20. As illustrated in FIG. 3, the laser radar 20 includes a light emitting system 201, a light detecting system 202, and an object information acquiring unit 203.

The light emitting system 201 is an optical system to emit detection light Li to the object 100. The detection light Li is emitted in the +X direction. The light detecting system 202 is an optical system to detect reflected light Lr which is the detection light Li reflected by the object 100. The light emitting system 201 and the light detecting system 202 are arrayed in line in the Z-axis direction. The light emitting system 201 is arranged on a +Z side of the light detecting system 202.

The object information acquiring unit 203 controls an operation of each of the light emitting system 201 and the light detecting system 202. Also, the object information acquiring unit 203 is connected to a main control apparatus 40 in a communicable manner through the bus 70 and mutually communicates various kinds of information with the main control apparatus 40 through the bus 70.

The object information acquiring unit 203 makes the light emitting system 201 and the light detecting system 202 operate and executes the "object information acquiring processing". By the object information acquiring processing, the object information acquiring unit 203 acquires a detection result of the reflected light Lr in the light detecting system 202. Based on the acquired detection result, the object information acquiring unit 203 acquires information (hereinafter referred to as "object information") related to presence/absence of the object 100, a distance to the object 100, a size of the object 100, a shape of the object 100, a position of the object 100, and the like. The object information acquired in the object information acquiring unit 203 is stored into the memory 50. A detail processing flow of the object information acquiring processing will be described later.

Note that the object information acquiring unit 203, the light emitting system 201, and the light detecting system 202 are housed in a chassis (not illustrated).

Configuration Example of Light Emitting System 201

Figure 4:
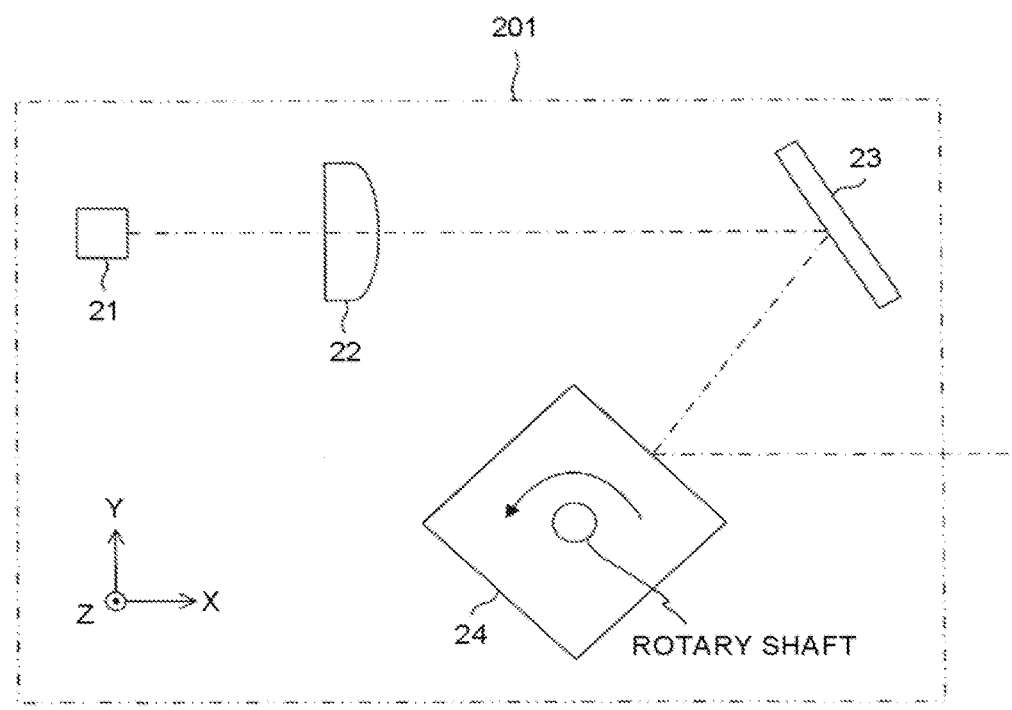
FIG. 4 is an optical arrangement view, on a YX plane, of a light emitting system included in the laser radar.
Figure 5:
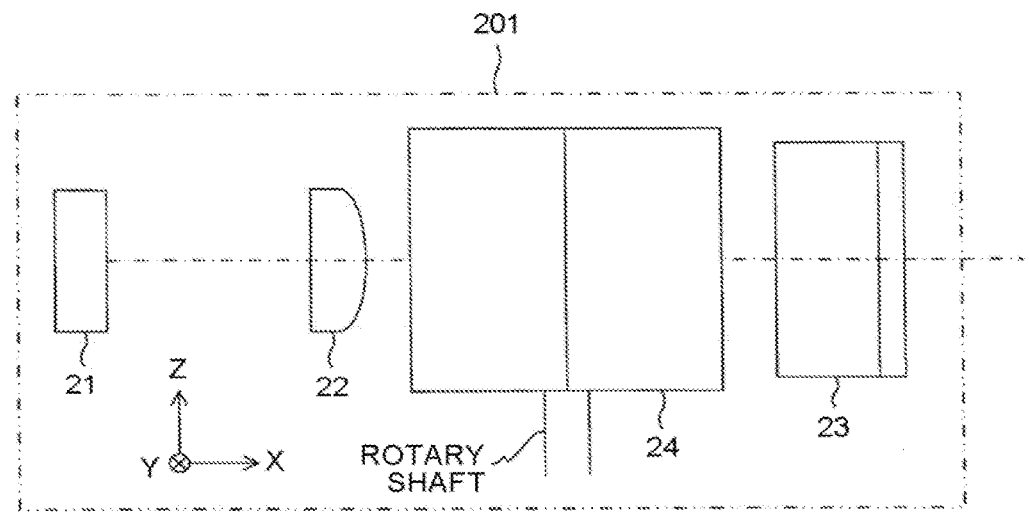
FIG. 5 is an optical arrangement view, on a ZX plane, of the light emitting system included in the laser radar.

Next, a configuration of the light emitting system 201 will be described. FIG. 4 and FIG. 5 are optical arrangement views illustrating an example of the light emitting system 201. FIG. 4 is an optical arrangement view of the light emitting system 201 on the YX plane. FIG. 5 is an optical arrangement view of the light emitting system 201 on the ZX plane.

As illustrated in FIG. 4 and FIG. 5, the light emitting system 201 includes a light source 21, a coupling lens 22, a first reflection mirror 23, and a first rotary mirror 24.

Figure 8:
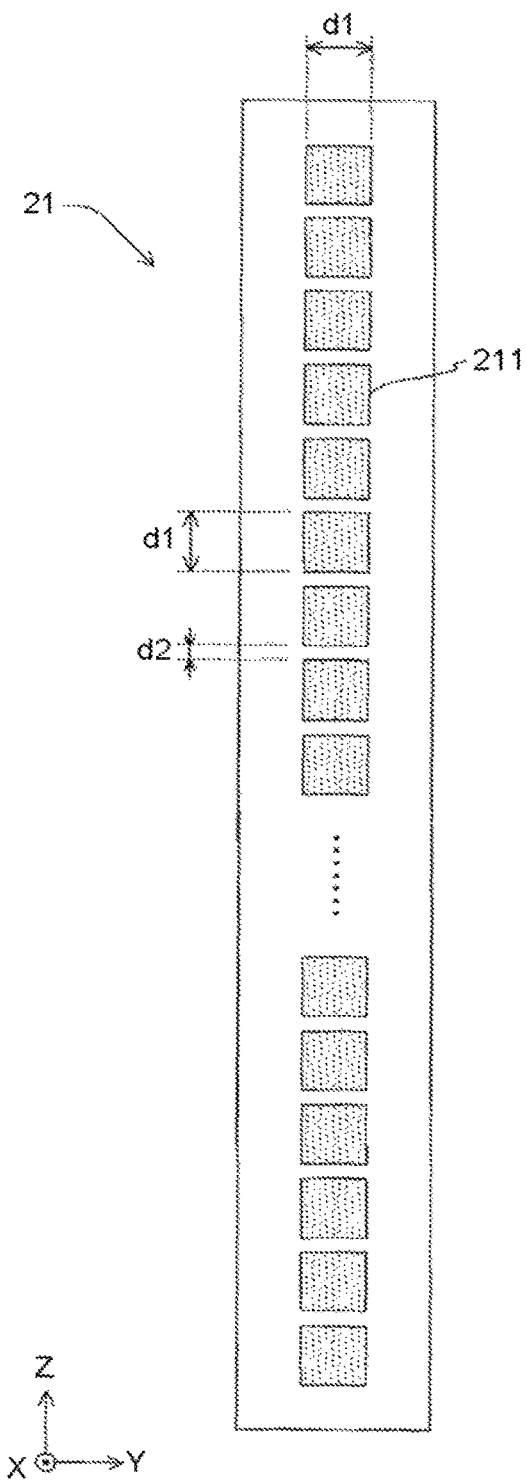
FIG. 8 is a plane view illustrating a configuration example of a light source included in the light emitting system.

First, the light source 21 will be described. FIG. 8 is a plane view illustrating a configuration example of the light source 21. As illustrated in FIG. 8, the light source 21 is a light projection unit including an array light source and includes a plurality of light emission areas 211. The light emission areas 211 are arranged in the Z-axis direction. The light emission areas 211 are arranged at regular intervals. A shape of each light emission area 211 is a square.

In the following description, in a case of distinguishing the plurality of light emission areas 211, which is included in the light source 21, from each other and referring to a specific light emission area 211, the specific light emission area 211 will be simply referred to as A (i). Here, i indicates an order of the light emission area 211 in the array, from an edge in the Z-axis direction, in the light source 21. For example, when the light source 21 includes 28 light emission areas 211, the light emission areas 211 included in the light source 21 are A (1) to A (28).

It is assumed that a length of one side of one light emission area 211 is d1. Also, it is assumed that a gap between adjacent light emission areas 211 is d2. Note that d1 which is the length of one side of one light emission area 211 is determined by the number of light emission units 2111 arranged in the one light emission area 211.

Figure 9:
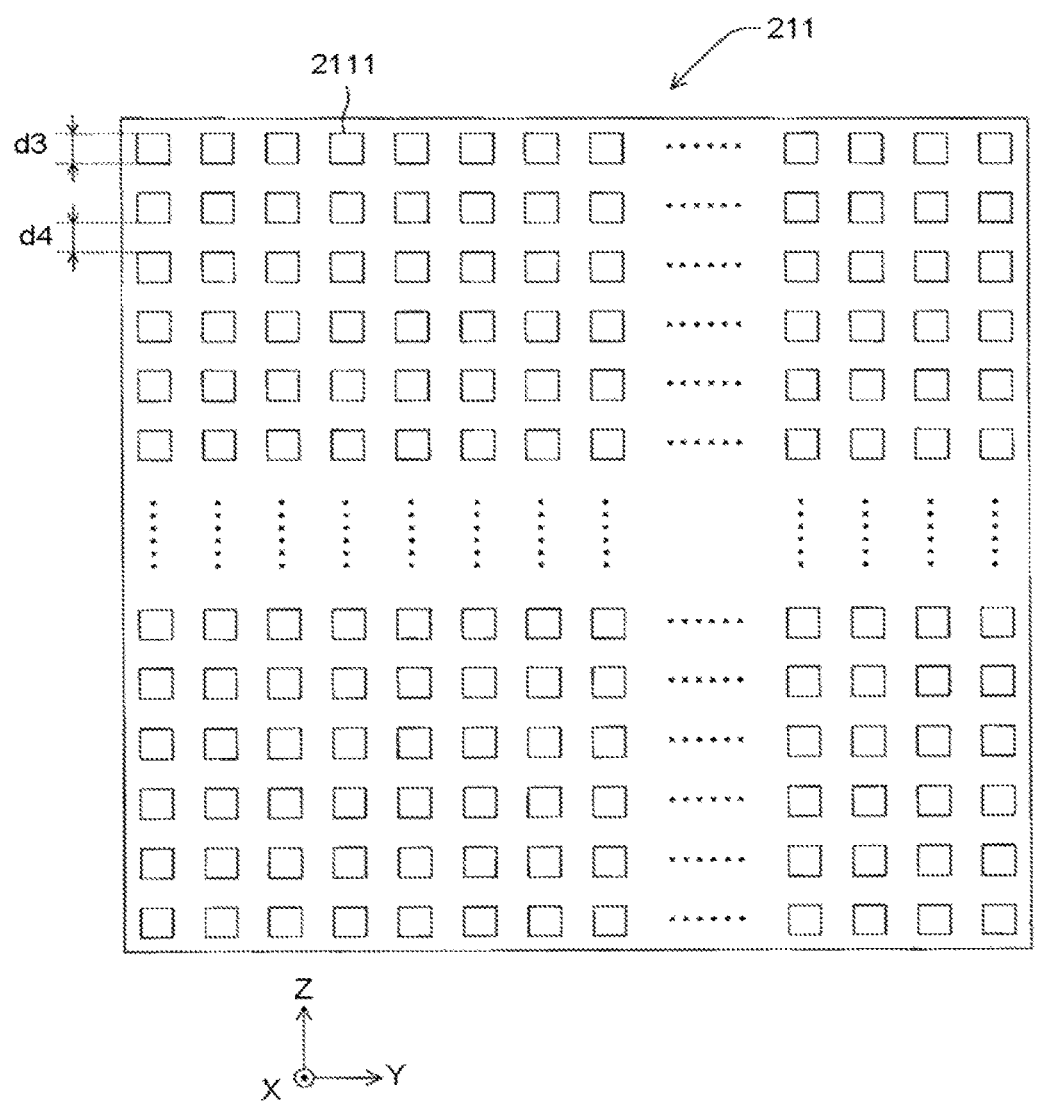
FIG. 9 is a plane view illustrating a configuration example of a light emission area included in the light source.

FIG. 9 is a plane view illustrating a configuration example of the one light emission area 211. As illustrated in FIG. 9, each of the light emission areas 211 is an aggregation of the plurality of light emission units 2111. The light emission units 2111 are arrayed two-dimensionally. Note that a shape of each of the light emission units 2111 is a square.

In the following description, it is assumed that there are 150 light emission units 2111 arrayed in the Y-axis direction and 150 light emission units 2111 arrayed in the Z-axis direction in one light emission area 211. That is, one light emission area 211 includes 22500 light emission units 2111.

It is assumed that a length of one side of each light emission unit 2111 is d3. Also, a gap between adjacent light emission units 2111 is d4.

In the light source 21, the length of d2 which is a gap between the adjacent light emission areas 211 is set as about 0.02 mm. Also, d3 which is the length of one side of each light emission unit 2111 is set as about 0.7 μm and the length of d4 which is a gap between the adjacent light emission units 2111 is set as about 1 μm.

Each of the light emission units 2111 is a vertical cavity surface emitting laser (VCSEL). That is, the light source 21 including the light emission units 2111, each of which is a VCSL, is so-called a surface emitting laser array.

Turning on and off of the light emission units 2111 are controlled by the object information acquiring unit 203. That is, lighting control of the light emission areas 211 is performed by the object information acquiring unit 203. An emitting direction of light emitted from the lighted light emission units 2111 is the +X direction.

Description goes back to FIG. 4 and FIG. 5. The coupling lens 22 is arranged on a side in the +X direction of the light source 21. Note that instead of the coupling lens 22, a coupling optical system including a function equivalent to that of the coupling lens 22 may be arranged. In this case, the coupling optical system may include a plurality of optical elements.

To improve accuracy of object information by using the laser radar 20, it is necessary to improve emission power of the light emitted from the light source 21. Therefore, it is necessary to increase the emission power of the light source 21. However, it is difficult to increase the emission power of the light emission units 2111 in principle.

As a method to increase the emission power of the light source 21, there is a method to configure the light source 21 with the light emission units 2111 integrated two-dimensionally. In this case, when emission power of one light emission unit 2111 is 1 mW, emission power of 22.5 W can be acquired by integrating 22500 light emission units 2111.

In the present embodiment, the light source 21 includes 28 light emission areas 211. Thus, the number of times of division of detection in the vertical direction (Z-axis direction) is set to "28". In such a manner, when the number of times of division can be increased, object information corresponding to a purpose of a user can be acquired.

For example, as illustrated in FIG. 1, when the laser radar 20 is mounted in the vehicle 1, object detection can be performed by dividing a visual field region of a driver of the vehicle 1 in the vertical direction (Z-axis direction). By receiving, with a photodetector 29, the reflected light Lr of pieces of the detection light Li respectively emitted from the 28 light emission areas 211 arrayed in the Z-axis direction, object information corresponding to the number (28) of the light emission areas 211 can be acquired. In such a manner, by using pieces of the detection light Li from the plurality of light emission areas 211 arrayed in the Z-axis direction of the visual field region (detection region), a plurality of pieces of the reflected light Lr is received. Thus, object information can be acquired in more detail.

Also, 28 light emission areas 211 arrayed in the vertical direction (Z-axis direction) can be classified into two groups when used. For example, 20 light emission areas 211 which are A (1) to A (20) are used for detection processing of the object 100 in the visual field region. On the other hand, eight light emission areas 211 which are A (21) to A (28) are used for detection processing of the object 100 on the road surface 2. In such a manner, by classifying the light emission areas 211 into two or more groups and forming detection region groups, a different object can be detected in each detection region.

In such a case, distance information included in the object information on the road surface 2 can also be used, for example, by calculating a tilt thereof, for calibration of a horizontal component (Y-axis direction) in acquiring distance information in the visual field region. Alternatively, information related to a distance to the object 100 on the road surface 2 can also be used for calculation of a safer inter-vehicular distance by being associated with a breaking distance in breaking. Also, trouble of the laser radar 20 or grime on a light receiving surface can be detected by calculating a quantity of the reflected light.

The first reflection mirror 23 is a reflection member to reflect light, which has passed the coupling lens 22, to the first rotary mirror 24.

The first rotary mirror 24 is an optical scanning unit and is a polygon mirror including a plurality of mirror surfaces (reflection surfaces) which rotates around a rotary shaft. The rotary shaft of the first rotary mirror 24 is parallel to the Z-axis. By the plurality of reflection surfaces included in the first rotary mirror 24, light from the first reflection mirror 23 is reflected in the X-axis direction. Each reflection surface of the first rotary mirror 24 is parallel to the rotary shaft. As illustrated in FIG. 4 and FIG. 5, the first rotary mirror 24 includes four reflection surfaces.

The light reflected by the reflection surfaces of the first rotary mirror 24 is scanned optically in the Y-axis direction, which is a first direction, by the rotation of the first rotary mirror 24. Rotation control of the first rotary mirror 24 is performed by the object information acquiring unit 203. Here, the light reflected by the reflection surfaces of the first rotary mirror 24 is the "detection light Li" emitted from the laser radar 20.

Figure 10:
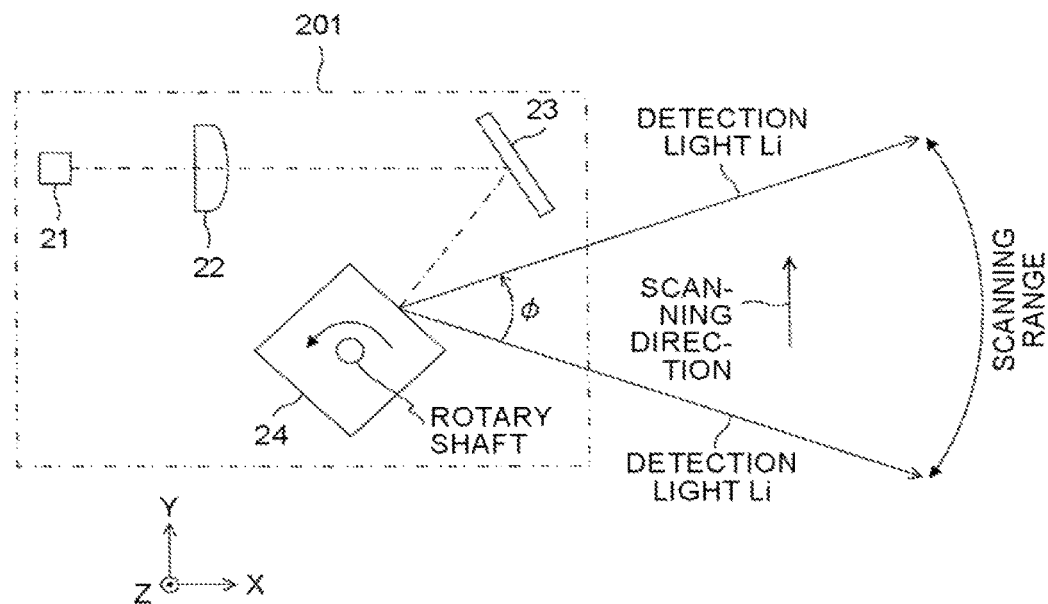
FIG. 10 is a view for describing an example of a scanning range of a first rotary mirror included in the light emitting system.

FIG. 10 is a view for describing an example of a scanning range of the first rotary mirror 24 included in the light emitting system 201. As illustrated in FIG. 10, a moving direction of the detection light Li varies on the YX plane orthogonal in the Z-axis direction by the rotation of the first rotary mirror 24. By the detection light Li, a scanning range is scanned in a +Y direction. That is, the scanning region is scanned in the Y-axis direction which is the first direction.

Note that as illustrated in FIG. 10, on the YX plane, an angle formed by detection light Li moving toward an edge on a −Y side of the scanning region and detection light Li moving toward an edge on the +Y side of the scanning region is also called a scanning angle φ. The scanning region by the detection light Li which forms the scanning angle φ is a range scanned by one of the reflection surfaces of the first rotary mirror 24.

When there is the object 100 (not illustrated) in the scanning range illustrated in FIG. 10, a part of the detection light Li is reflected by the object 100. A part of the reflected light returns to the laser radar 20. The light which is reflected by the object 100 and returns to the laser radar 20 is the reflected light Lr.

Configuration Example of Light Detecting System 202

Figure 6:
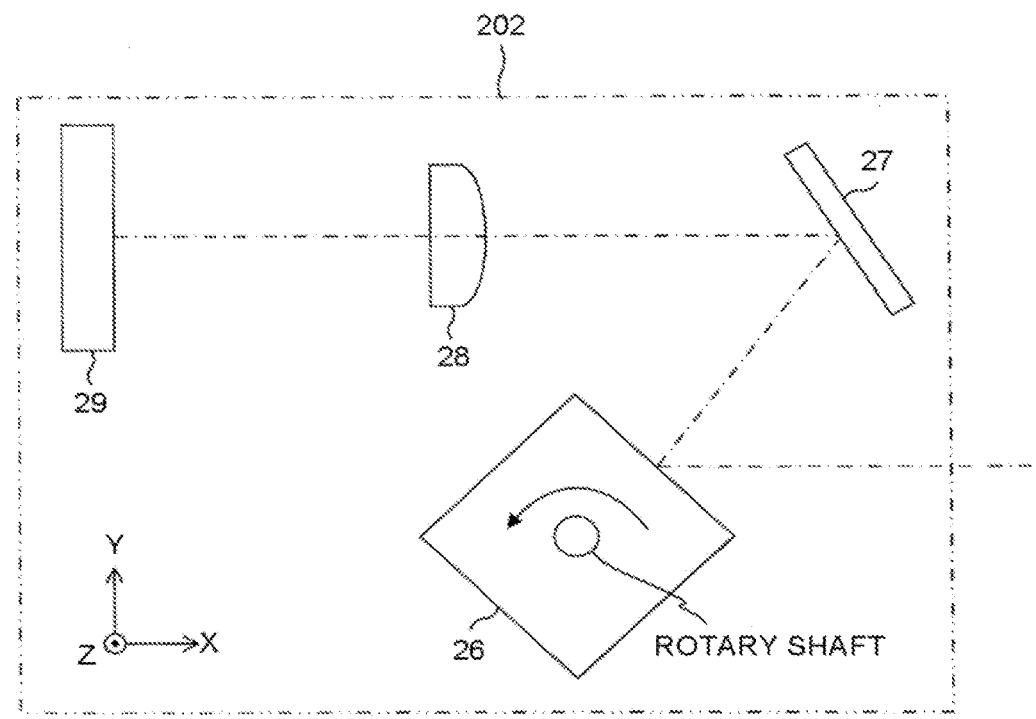
FIG. 6 is an optical arrangement view, on the YX plane, of a light detecting system included in the laser radar.
Figure 7:
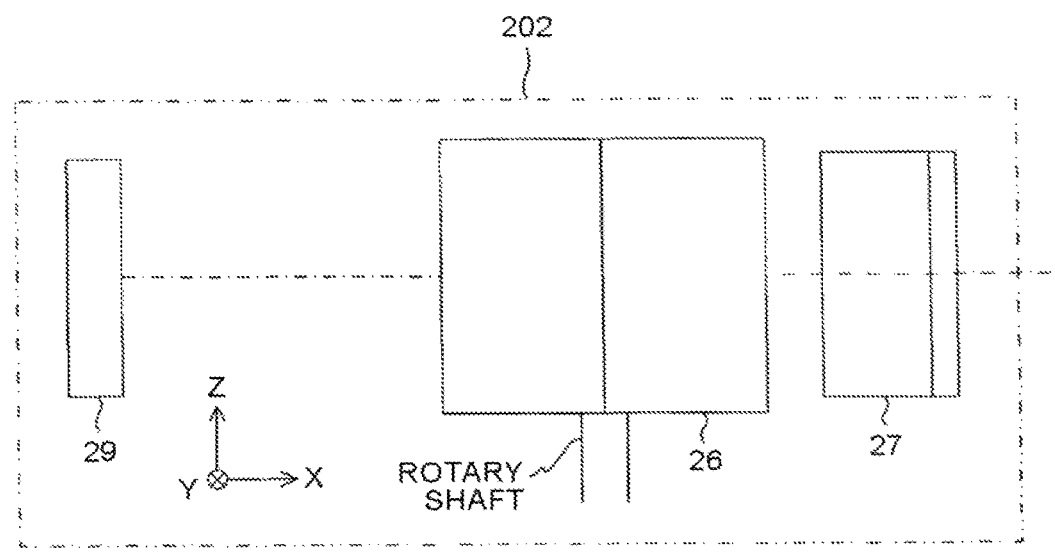
FIG. 7 is an optical arrangement view, on the ZX plane, of the light detecting system included in the laser radar.

Next, a configuration of the light detecting system 202 will be described. FIG. 6 and FIG. 7 are optical arrangement views illustrating an example of the light detecting system 202. FIG. 6 is an optical arrangement view of the light detecting system 202 on the YX plane. FIG. 7 is an optical arrangement view of the light detecting system 202 on the ZX plane.

As illustrated in FIG. 6 and FIG. 7, the light detecting system 202 includes a second rotary mirror 26, a second reflection mirror 27, an imaging forming lens 28, and the photodetector 29.

The second rotary mirror 26 is a polygon mirror including a plurality of mirror surfaces (reflection surfaces) which rotates around the rotary shaft. Similarly to the first rotary mirror 24, the second rotary mirror 26 includes a rotary shaft parallel to the Z-axis. Each of the plurality of reflection surfaces included in the second rotary mirror 26 is parallel to the rotary shaft. As illustrated in FIG. 6 and FIG. 7, the second rotary mirror 26 includes four reflection surfaces.

The reflected light Lr which is a part of the detection light Li reflected by the object 100 is reflected by the reflection surfaces of the second rotary mirror 26 and moves toward a mirror surface of the second reflection mirror 27. Rotation control of the second rotary mirror 26 is performed by the object information acquiring unit 203.

The second reflection mirror 27 is a reflection member to reflect the light from the second rotary mirror 26 in a −X direction.

The imaging forming lens 28 is arranged on the −X side of the second reflection mirror 27 and is a condenser lens to condense the light reflected by the second reflection mirror 27.

The photodetector 29 is a light receiving unit to receive the light which passes the imaging forming lens 28. The photodetector 29 outputs, to the object information acquiring unit 203, a signal corresponding to a quantity of the received light (received light quantity). When an output level of the signal from the photodetector 29 is equal to or higher than a threshold set in advance, the object information acquiring unit 203 determines that the light detecting system 202 receives the reflected light Lr from the object 100. As a light receiving element included in the photodetector 29, an avalanche photodiode (APD) or a pin photodiode (PD) can be used.

Rotating operations of the first rotary mirror 24 and the second rotary mirror 26 are synchronized by control by the object information acquiring unit 203. That is, the first rotary mirror 24 and the second rotary mirror 26 are controlled to have the same rotation angle. A rotation angle sensor (such as hall element) to detect a rotation angle is provided to each of the first rotary mirror 24 and the second rotary mirror 26. An output signal from each of the rotation angle sensors is transmitted to the object information acquiring unit 203. Based on the output signal from each of the rotation angle sensors, the object information acquiring unit 203 detects a rotation angle of each of the first rotary mirror 24 and the second rotary mirror 26.

As described above, the object information acquiring unit 203 included in the laser radar 20 controls an operation of turning on and turning off the light source 21 and also controls rotating operations of the first rotary mirror 24 and the second rotary mirror 26.

Also, based on the output signal from the photodetector 29, the object information acquiring unit 203 acquires information related to presence/absence of the object 100 and executes processing to determine whether there is the object 100. Also, when the object information acquiring unit 203 determines that "there is the object 100", the object information acquiring unit 203 executes processing to acquire "object information" including, for example, a distance to the object based on lighting timing of the light source 21 and light receiving timing in the photodetector 29. In other words, the object information acquiring unit 203 executes processing to detect presence/absence of an object based on timing at which the light is emitted from the light emission areas 211 and timing at which the photodetector 29 receives the reflected light.

Note that the first rotary mirror 24 included in the light emitting system 201 and the second rotary mirror 26 included in the light detecting system 202 may be integrated.

Figure 37:
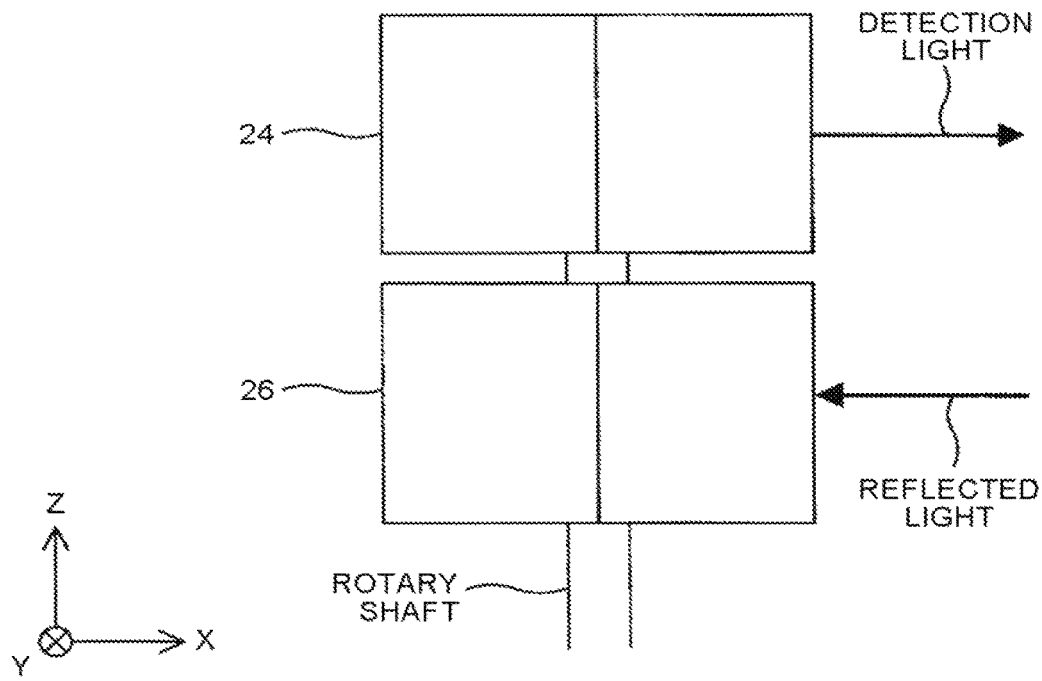
FIG. 37 is a view illustrating a different example of a first rotary mirror and a second rotary mirror included in the laser radar.

FIG. 37 is a view illustrating a different example of the first rotary mirror 24 and the second rotary mirror 26. As illustrated in FIG. 37, the first rotary mirror 24 and the second rotary mirror 26 may include the same rotary shaft and the first rotary mirror 24 and the second rotary mirror 26 may be arranged in the Z-axis direction.

Figure 38:
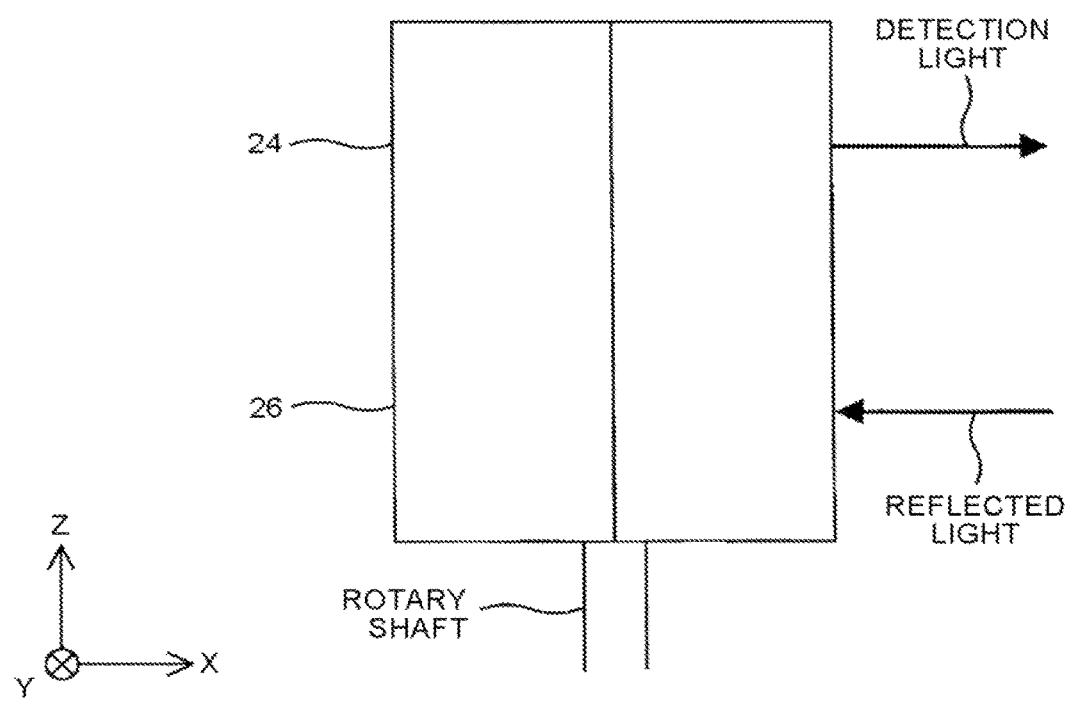
FIG. 38 is a view illustrating a different example of the first rotary mirror and the second rotary mirror included in the laser radar.

Also, FIG. 38 is a view illustrating a different example of the first rotary mirror 24 and the second rotary mirror 26. As illustrated in FIG. 38, the first rotary mirror 24 and the second rotary mirror 26 may include reflection surfaces in common. In this case, the reflection surfaces of the first rotary mirror 24 and the reflection surfaces of the second rotary mirror 26 are distinguished from each other according to a position in the Z-axis direction.

First Arrangement Example of Coupling Lens 22 and Imaging Forming Lens 28

Figure 11:
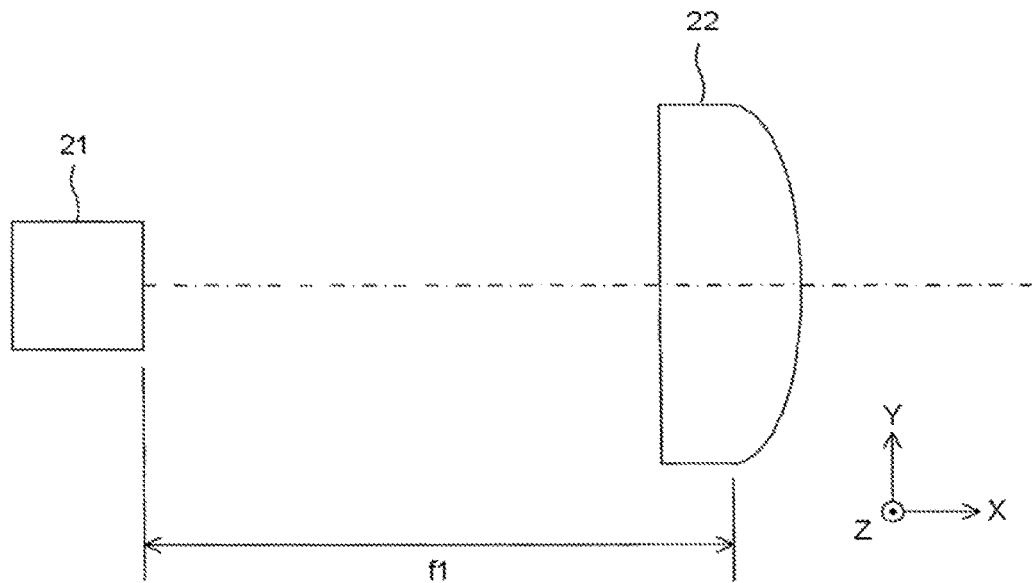
FIG. 11 is an optical arrangement view illustrating a first arrangement example, on the YX plane, of a light source and a coupling lens included in the light emitting system.

Next, an example of an optical arrangement of the coupling lens 22 and the imaging forming lens 28 included in the laser radar 20 will be described. First, an example of an optical arrangement of the light source 21 and the coupling lens 22 included in the light emitting system 201 will be described. FIG. 11 is an optical arrangement view illustrating a first arrangement example, on the YX plane, of the light source 21 and the coupling lens 22.

As illustrated in FIG. 11, the coupling lens 22 is arranged in the +X direction of the light source 21. A distance between the coupling lens 22 and the light source 21 is identical to a focal length (f1) of the coupling lens 22. That is, when seen from the light source 21, the coupling lens 22 is arranged at a position which is away therefrom by a distance corresponding to the focal length (f1).

When the distance between the coupling lens 22 and the light source 21 is identical to the focal length (f1) of the coupling lens 22, light emitted from one of the light emission units 2111 in one light emission area 211 included in the light source 21 becomes substantially parallel light by the coupling lens 22.

However, since the light source 21 includes a plurality of light emission units 2111 in one light emission area 211, when the plurality of light emission units 2111 is lighted simultaneously, light which has passed the coupling lens 22 does not become the parallel light. It is because an optical path of light emitted from a light emission unit 2111 arranged at a lower end in the Z-axis direction of the one light emission area 211 and that of light emitted from a light emission unit 2111 arranged at an upper edge in the Z-axis direction thereof are slightly different from each other.

Figure 12:
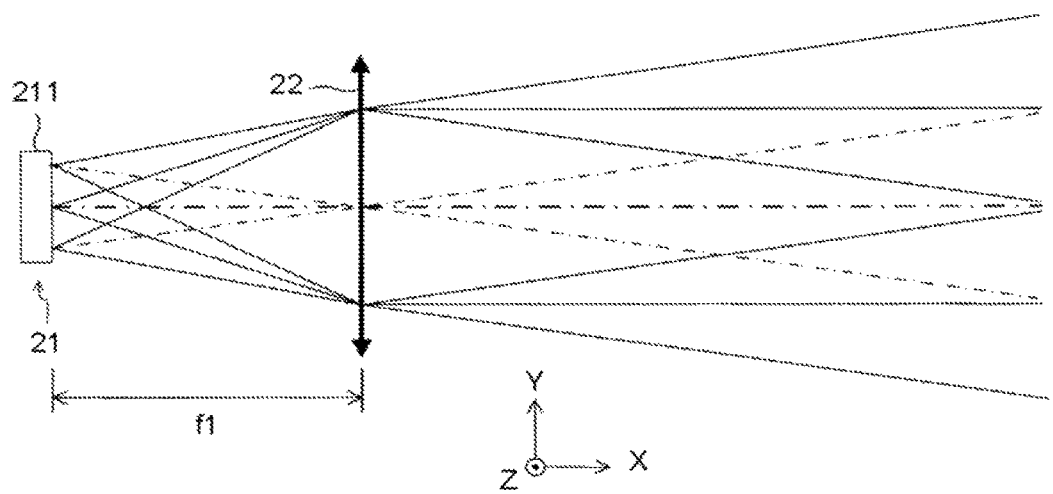
FIG. 12 is a view of an optical path on an XY plane illustrating an example of an optical path of light which passes the coupling lens in the first arrangement example.

FIG. 12 is a view of an optical path illustrating an example of an optical path of the light emitted from the plurality of light emission units 2111 simultaneously in the first arrangement example. As illustrated in FIG. 12, when the plurality of light emission units 2111 included in one of the light emission areas 211 in the light source 21 is lighted simultaneously, apiece of light emitted from each of the light emission units 2111 becomes parallel light after passing the coupling lens 22. However, the light, which is emitted from the one light emission area 211, as a whole becomes divergent light bypassing the coupling lens 22. However, a formed position of a conjugate image of the light source 21 by the coupling lens 22 is at infinity.

Figure 13:
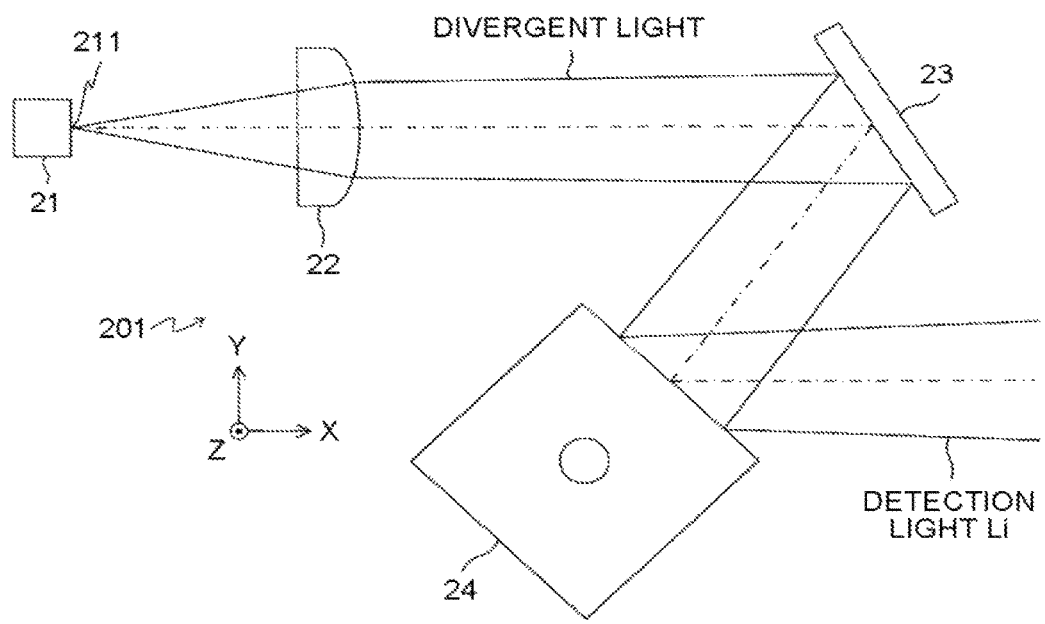
FIG. 13 is a view of an optical path on the YX plane illustrating an example of an optical path of light emitted from the light emission area in the first arrangement example.
Figure 14:
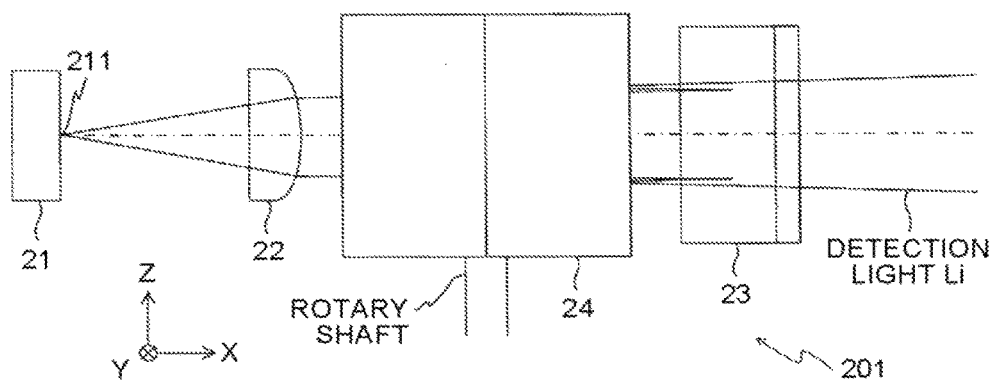
FIG. 14 is a view of an optical path on the ZX plane illustrating an example of the optical path of the light emitted from the light emission area in the first arrangement example.

FIG. 13 is a view of an optical path illustrating an example of an optical path, on the YX plane, of the light emitting system 201 in the first arrangement example. FIG. 14 is a view of an optical path illustrating an example of an optical path on the ZX plane in the first arrangement example of the light emitting system 201.

As illustrated in FIG. 13 and FIG. 14, the light emitted from the one light emission area 211 passes the coupling lens 22 and becomes the divergent light. Then, the light is emitted through the first reflection mirror 23 and the first rotary mirror 24. That is, the detection light Li emitted from the laser radar 20 is the divergent light.

Figure 15:
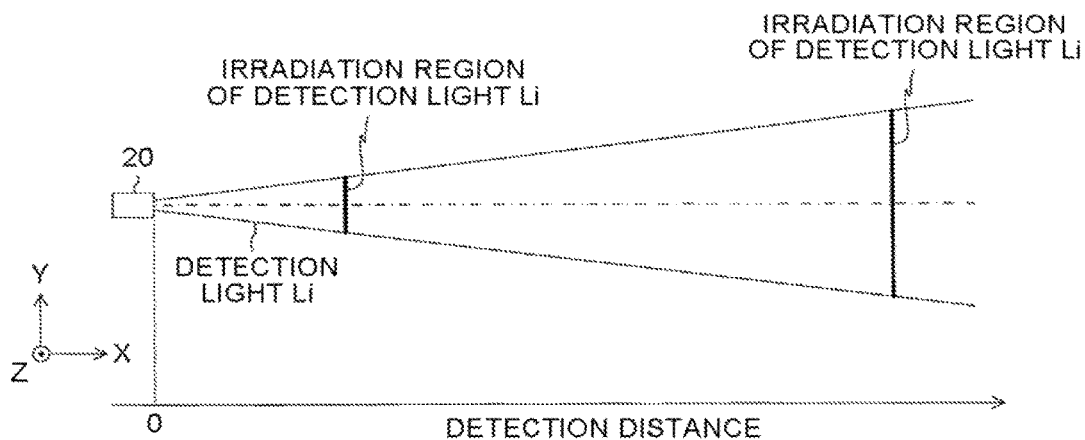
FIG. 15 is a view for describing a relationship between an irradiation region of detection light and a detection distance of an object in the first arrangement example.

FIG. 15 is a view for describing a relationship between an irradiation region of the detection light Li and a detection distance of the object 100. As illustrated in FIG. 15, a divergent degree of the detection light Li is increased as a distance from the light source 21 becomes longer. That is, a spread of the detection light Li in the Y direction on the YX plane becomes wider as the detection distance becomes longer. In such a manner, a spread (size) of the irradiation region of the detection light Li in the Y-axis direction is different according to a detection distance.

Thus, in the laser radar 20, the irradiation region of the detection light Li is different according to a distance to the object 100. Note that in a lighted region in a stricter manner, it is necessary to distinguish the irradiation region according to a distance (detection distance) to the detected object 100. However, in the following description, in order to avoid complexity, the irradiation region, as a whole, by the detection light Li will be simply referred to as an "irradiation region" without being distinguished by a detection distance.

Figure 16:
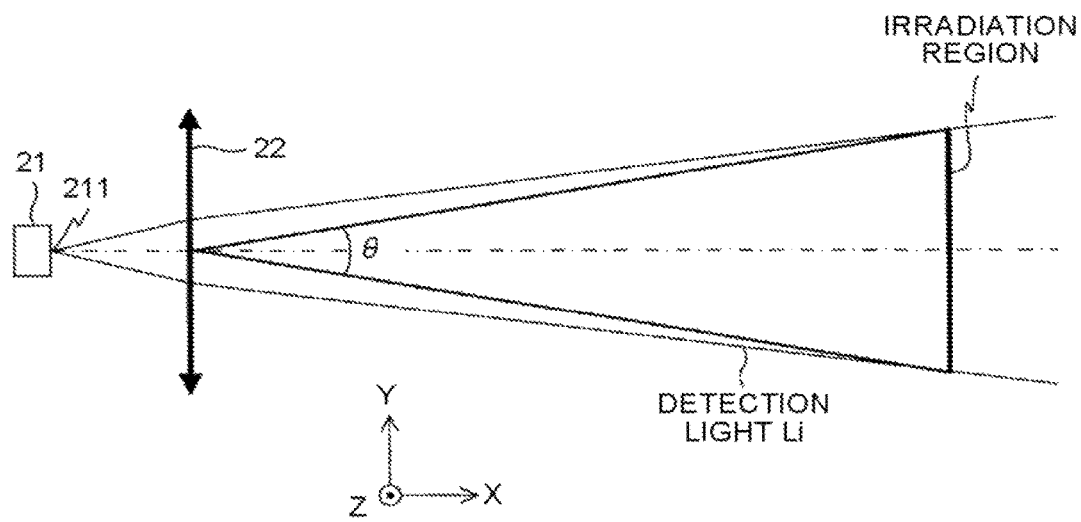
FIG. 16 is a view for describing a definition of an irradiation angle θ.

Here, an "irradiation angle" will be defined as what indicates a spread of the irradiation region. FIG. 16 is a view for describing a definition of the irradiation angle. As illustrated in FIG. 16, light emitted from one of the light emission areas 211 included in the light source 21 passes the coupling lens 22 and diverges, whereby the light becomes the detection light Li. When a spread of a lighted region in a certain distance is seen with a center of the coupling lens 22 as a viewpoint, an angle θ formed by the detection light Li which forms the lighted region is an "irradiation angle".

Figure 17:
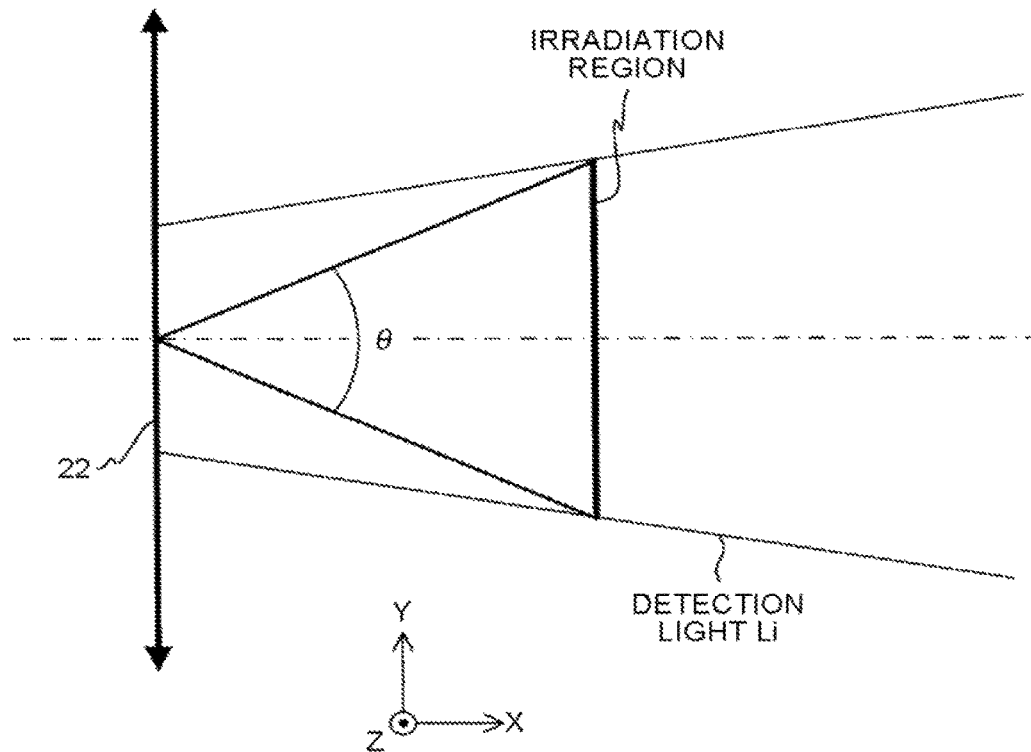
FIG. 17 is a view illustrating an example of a relationship between the irradiation angle θ and a detection distance on the YX plane in the first arrangement example.
Figure 18:
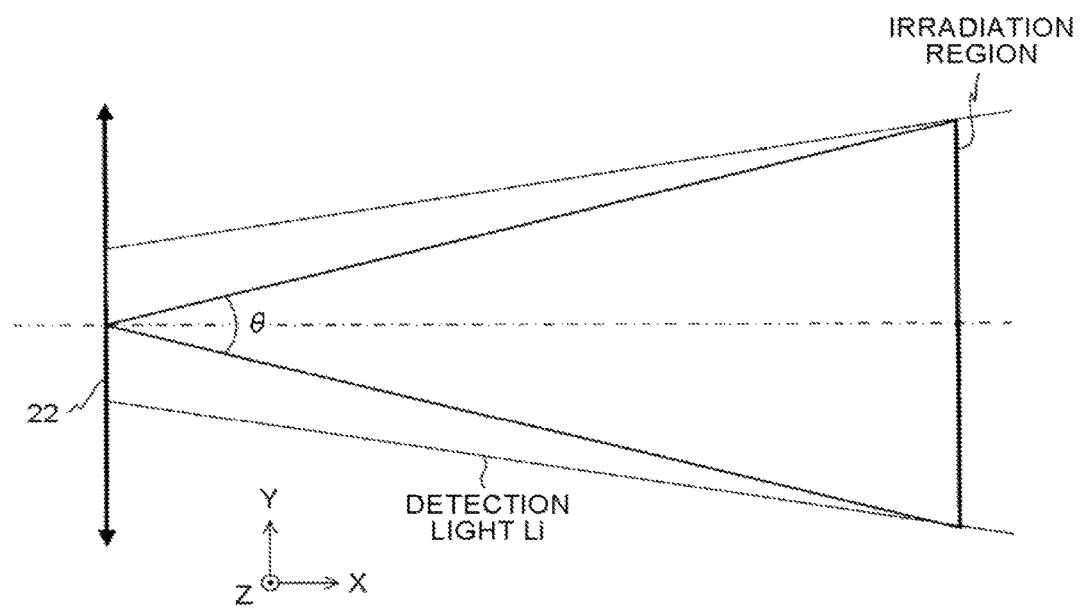
FIG. 18 is a view illustrating a different example of the relationship between the irradiation angle θ and the detection distance on the YX plane in the first arrangement example.

FIG. 17 is a view illustrating an example of a relationship between a certain detection distance and an irradiation angle θ on the YX plane in the first arrangement example. FIG. 18 is a view illustrating a different example of a relationship between a certain detection distance and an irradiation angle θ on the YX plane in the first arrangement example. When FIG. 17 and FIG. 18 are compared, a detection distance from the center of the coupling lens 22 is shorter in the example in FIG. 17 and is longer in the example illustrated in FIG. 18. A spread of the irradiation region on a YZ plane is narrower in the example illustrated in FIG. 17 and is wider in the example illustrated in FIG. 18. Also, an irradiation angle θ is larger in the example illustrated in FIG. 17 and is smaller in the example illustrated in FIG. 18. That is, the irradiation angle θ becomes larger as a detection distance becomes shorter, and becomes smaller as a detection distance becomes longer.

Figure 19:
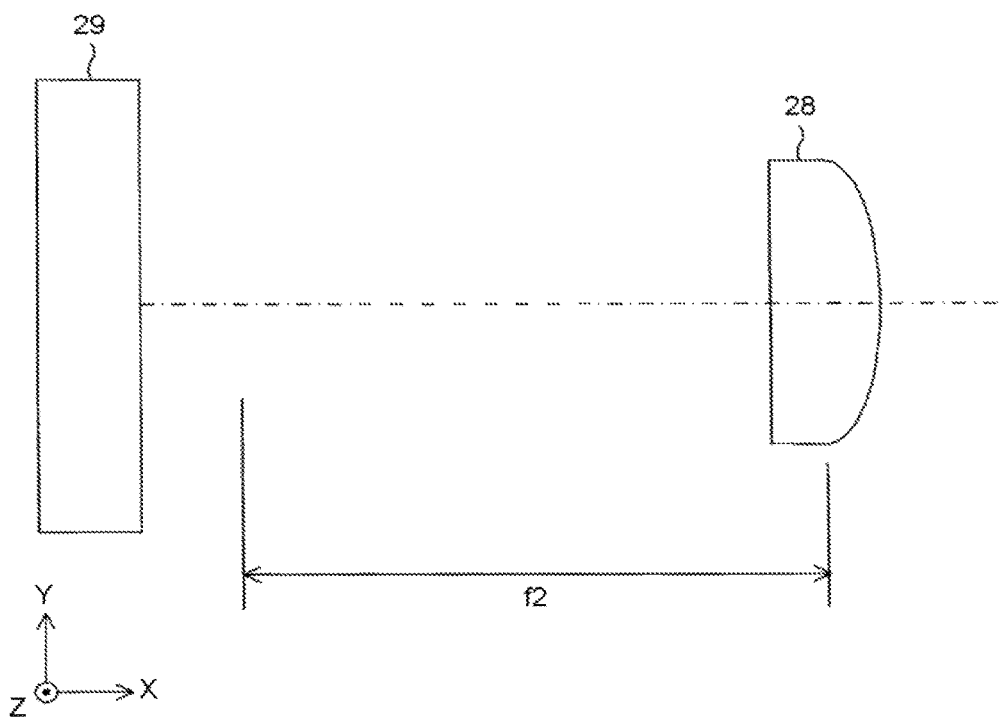
FIG. 19 is an optical arrangement view illustrating an example of an arrangement, on the YX plane, of an imaging forming lens and a photodetector included in the light detecting system in the first arrangement example.

Next, an example of an optical arrangement of the imaging forming lens 28 and the photodetector 29 included in the light detecting system 202 will be described. FIG. 19 is an optical arrangement view illustrating a relationship on the YX plane between the imaging forming lens 28 and the photodetector 29 in the first arrangement example. As illustrated in FIG. 19, the imaging forming lens 28 is arranged in the +X direction of the photodetector 29. A distance between the imaging forming lens 28 and the photodetector 29 is longer than a focal length (f2) of the imaging forming lens 28. That is, the photodetector 29 is arranged in a position farther than the focal length (f2) when seen from the imaging forming lens 28.

Figure 20:
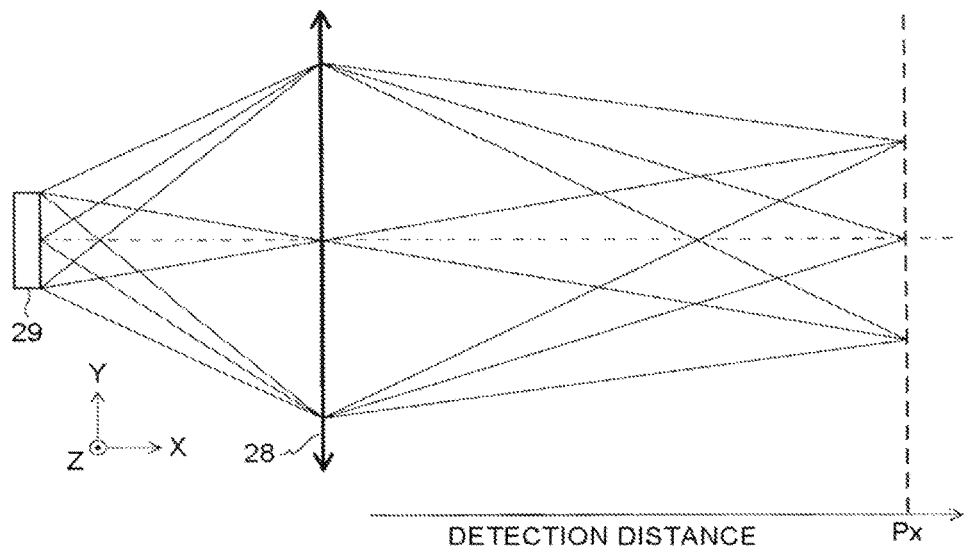
FIG. 20 is a view for describing an example of a conjugate position of the photodetector in the first arrangement example.

Next, a position of a conjugate image of the photodetector 29 in the first arrangement example will be described. FIG. 20 is a view for describing a conjugate position of the photodetector 29 in the first arrangement example. As illustrated in FIG. 20, when the photodetector 29 is an object point, since a distance between the imaging forming lens 28 and the photodetector 29 is longer than the focal length (f2) of the imaging forming lens 28, an image of the photodetector 29 is formed at a certain detection distance. It is assumed that the detection distance at which the image of the photodetector 29 is formed is Px. That is, a position in the +X direction, a distance to which position from the laser radar 20 is Px, becomes a formed position of the conjugate image of the photodetector 29 by the imaging forming lens 28. In the following description, is assumed that Px is "80 m".

Figure 21:
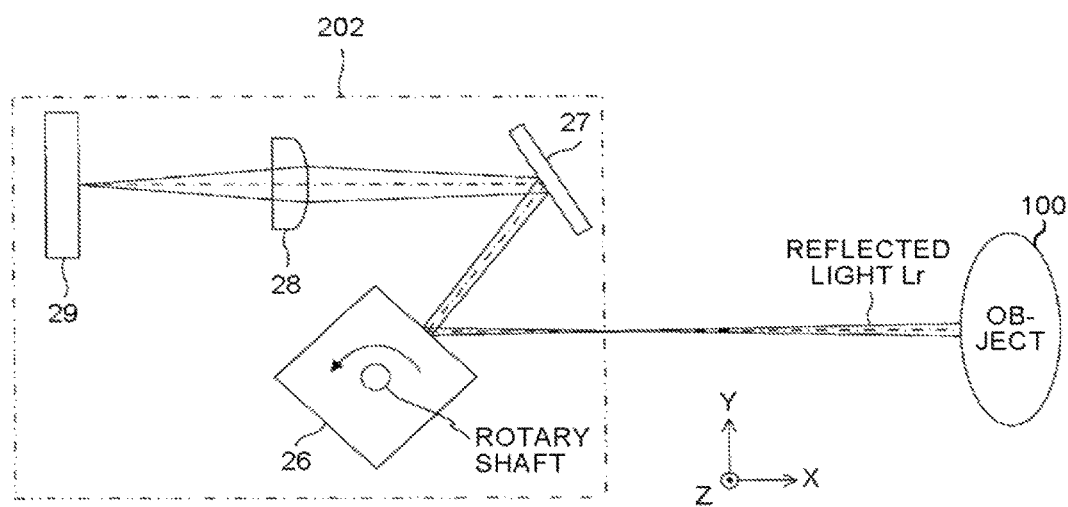
FIG. 21 is a view of an optical path on the YX plane illustrating an example of an optical path of reflected light which enters the photodetector in the first arrangement example.
Figure 22:
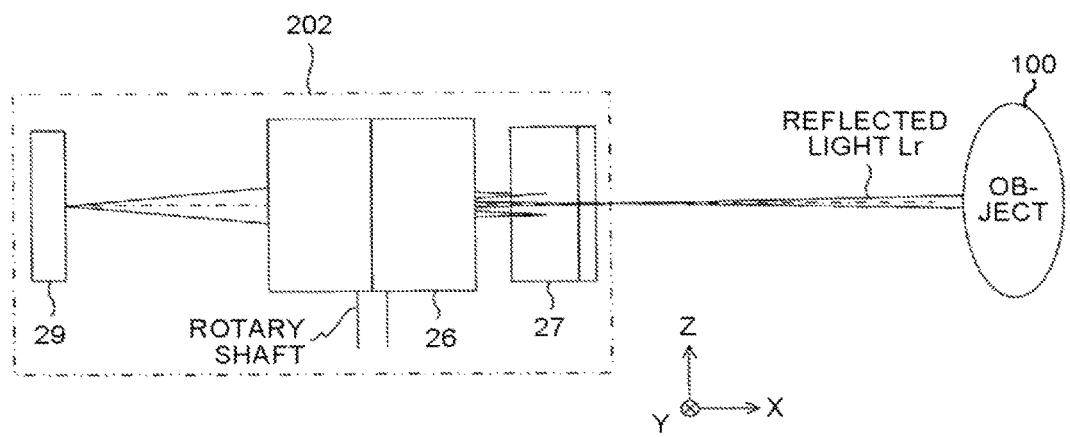
FIG. 22 is a view of an optical path on the ZX plane illustrating an example of the optical path of the reflected light which enters the photodetector in the first arrangement example.

Next, an optical path of the reflected light Lr in the first arrangement example will be described. FIG. 21 is a view of an optical path illustrating an example of an optical path, on the YX plane, of the reflected light which enters the photodetector in the first arrangement example. FIG. 22 is a view of an optical path illustrating an example of the optical path, on the ZX plane, of the reflected light which enters the photodetector in the first arrangement example.

As illustrated in FIG. 21 and FIG. 22, the reflected light Lr from the object 100 is reflected by the second rotary mirror 26 and the second reflection mirror 27, passes the imaging forming lens 28, and is received by the photodetector 29. The conjugate image of the photodetector 29 is formed at a position at a distance corresponding to Px.

According to the coupling lens 22 and the imaging forming lens 28 which have been described above in the first arrangement example, the conjugate image of the light source 21 is formed at infinity and the conjugate image of the photodetector 29 is formed near the laser radar 20.

Figure 23:
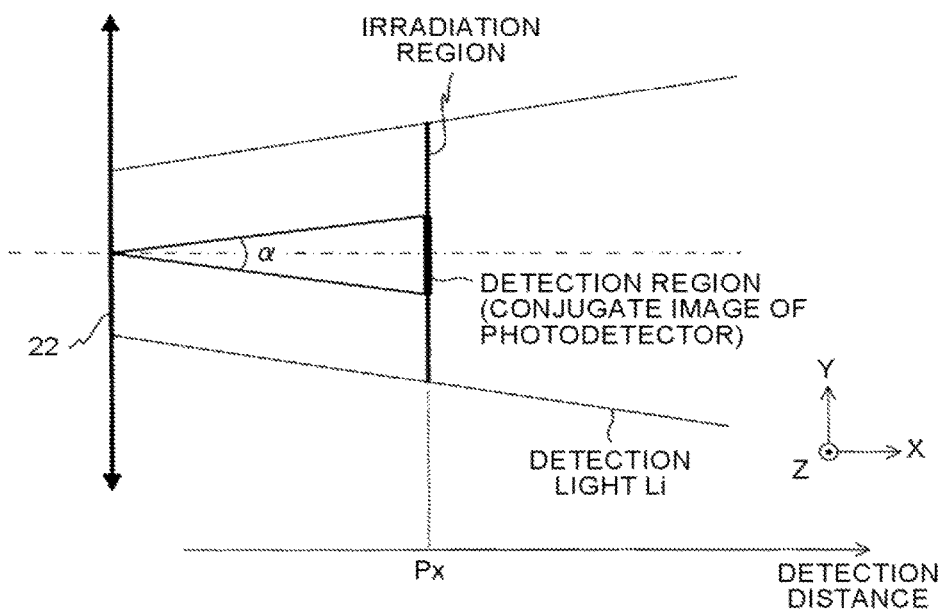
FIG. 23 is a view illustrating an example of a relationship on the YX plane between an irradiation region and a detection region at a conjugate position of the photodetector in the first arrangement example.

FIG. 23 is a view illustrating a relationship between an irradiation region and a detection region at the conjugate position of the photodetector 29 on the YX plane in the first arrangement example. As illustrated in FIG. 23, in the first arrangement example, when spreads of a lighted region and a detection region in the Y direction at a position at which a detection distance is Px are compared, the spread of the detection region in the Y direction becomes narrower than the spread of the lighted region in the Y direction at the detection distance (Px) which becomes the conjugate position of the photodetector 29.

That is, when the object 100 is at a position which is in the X direction of the laser radar 20 at the distance "Px" and a distance to which in the Y-axis direction corresponds to the inside of the conjugate image of the photodetector 29, the photodetector 29 receives the reflected light Lr from the object 100. In other words, in the first arrangement example, a region in which the conjugate image of the photodetector 29 is formed corresponds to a "detection region" in which the object 100 can be detected by the reflected light Lr of when the detection light Li is emitted to the object 100.

Figure 24:
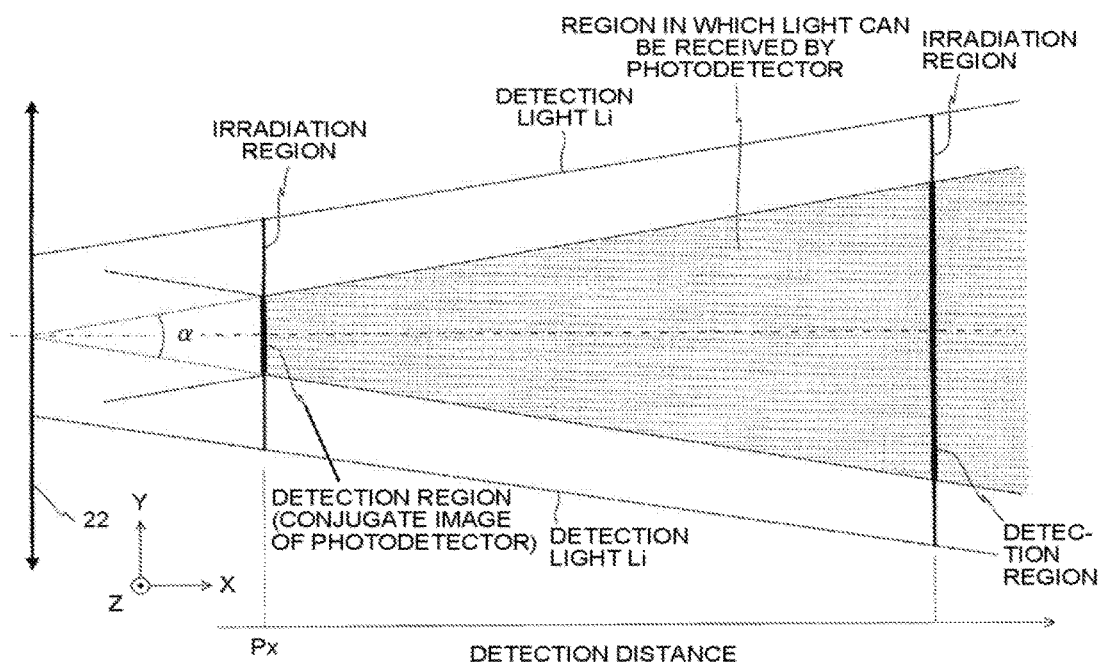
FIG. 24 is a view for describing an example of a detection angle α in the first arrangement example.

Here, a "detection angle" will be defined as what indicates a spread of the detection region. FIG. 24 is a view for describing a definition of the detection angle in the first arrangement example. As illustrated in FIG. 24, when a spread of the detection region at a position at a distance Px, is seen with a center of the coupling lens 22 as a viewpoint, an angle α which is formed at the center of the coupling lens 22 is the "detection angle".

The detection angle is substantially constant at a position where the detection distance is Px or longer. Also, within a range of a detection distance requested to the laser radar 20, a size of the detection region is smaller than that of the lighted region. Thus, the laser radar 20 can divide the lighted region further smaller and set each of the divided lighted regions as the detection region. That is, the laser radar 20 can improve detection resolution.

Note that at a position where the detection distance is shorter than Px, the detection region becomes larger than the detection region in Px. That is, a size of the detection region becomes the smallest in Px. Thus, Px may be set as the shortest detection distance. In this case, the object information acquiring processing executed in the object information acquiring unit 203 can be simplified.

Second Arrangement Example of Coupling Lens 22 and Imaging Forming Lens 28

Figure 25:
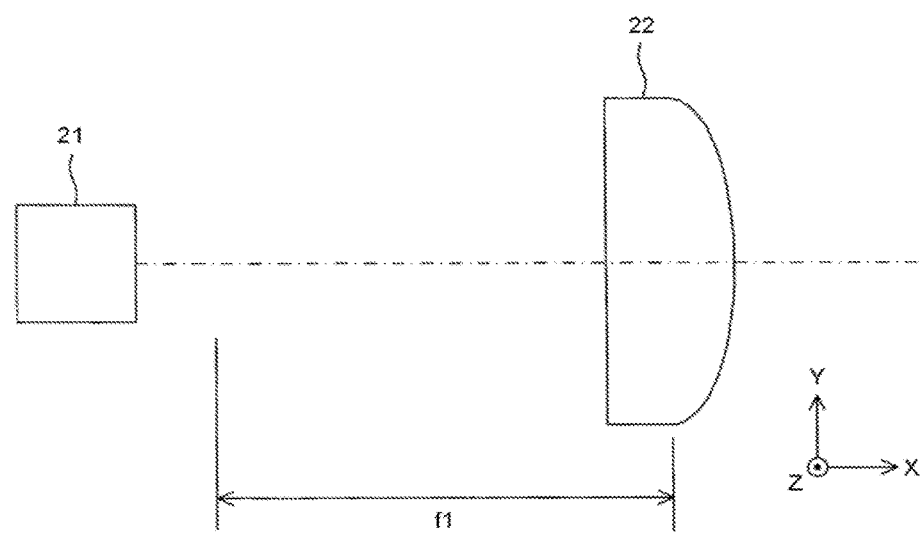
FIG. 25 is an optical arrangement view illustrating a second arrangement example, on the YX plane, of the light source and the coupling lens included in the laser radar.

Next, a different example of an optical arrangement of the coupling lens 22 and the imaging forming lens 28 included in the laser radar 20 will be described. First, a different example of an optical arrangement of the light source 21 and the coupling lens 22 included in the light emitting system 201 will be described. FIG. 25 is an optical arrangement view illustrating a second arrangement example, on the YX plane, of the light source 21 and the coupling lens 22.

As illustrated in FIG. 25, the coupling lens 22 according to the second arrangement example is arranged in the +X direction of the light source 21 and a distance thereto is longer than the focal length (f1) of the coupling lens 22.

Figure 26:
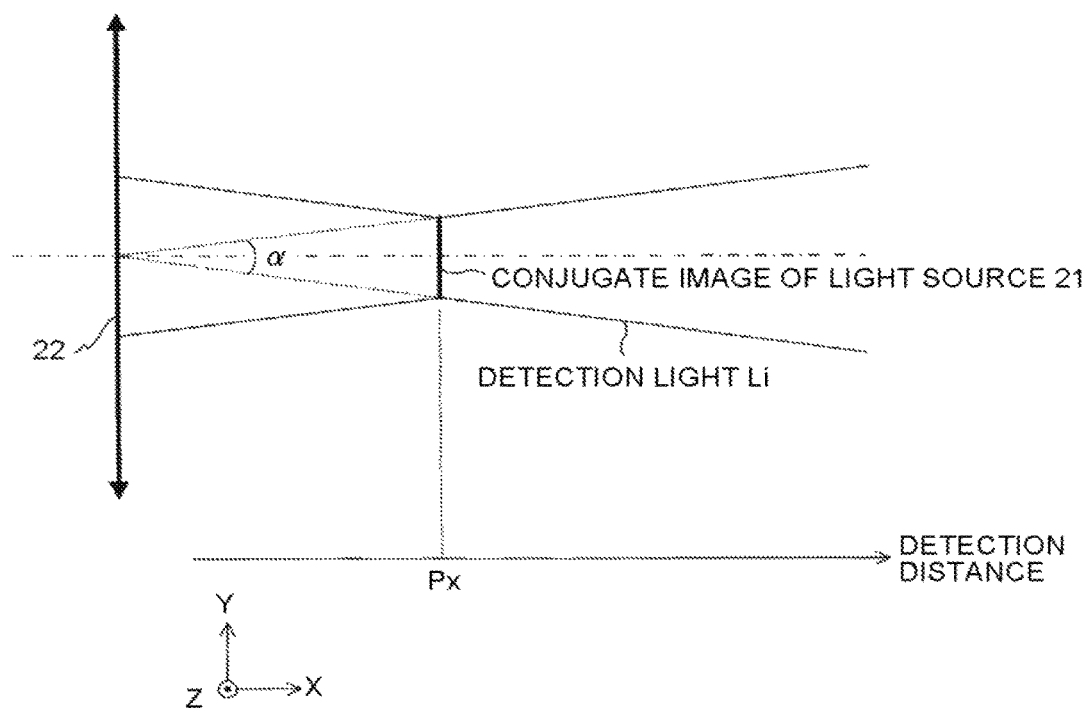
FIG. 26 is a view for describing an example of a formed position of a conjugate image of the light source in the second arrangement example.

FIG. 26 is a view for describing a formed position of a conjugate image of the light source 21 in the second arrangement example. As illustrated in FIG. 26, in the second arrangement example, a formed position of the conjugate image of the light source 21 by the coupling lens 22 is at the distance "Px" described in the first arrangement example.

Figure 27:
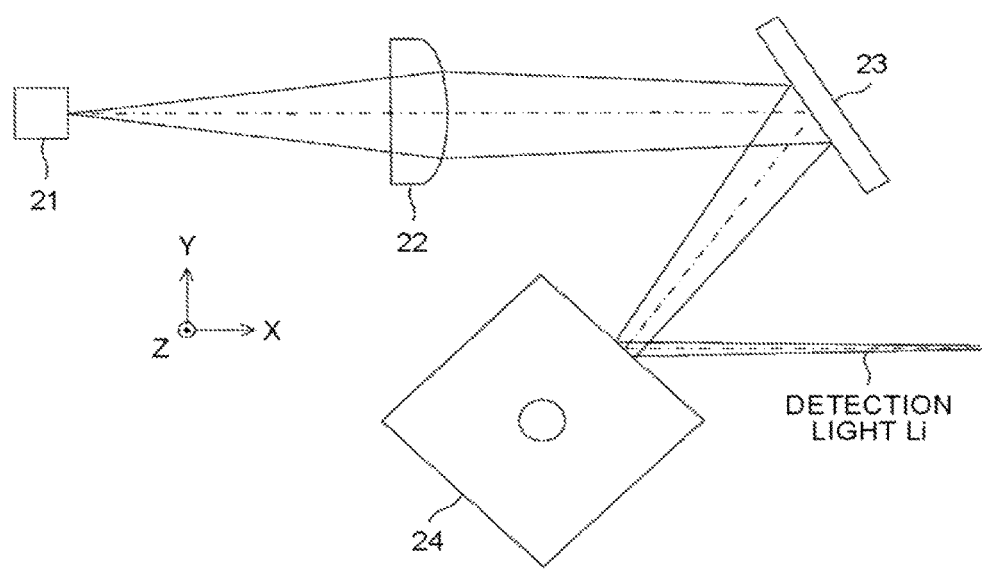
FIG. 27 is a view of an optical path on the YX plane illustrating an example of an optical path of detection light in the second arrangement example.
Figure 28:
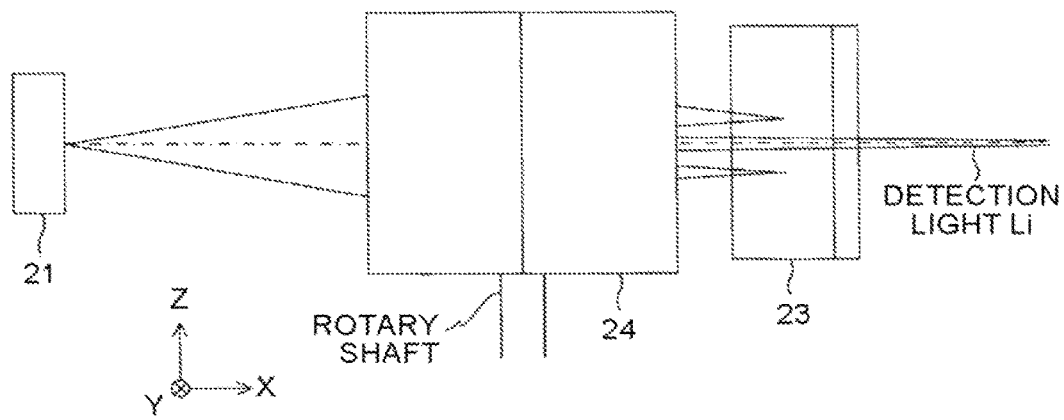
FIG. 28 is a view of an optical path on the ZX plane illustrating an example of the optical path of the detection light in the second arrangement example.

Next, an optical path of the detection light Li in the second arrangement example will be described. FIG. 27 is a view of an optical path illustrating an example of an optical path of the detection light Li on the YX plane in the second arrangement example. FIG. 28 is a view of an optical path illustrating an example of an optical path of the detection light Li on the ZX plane in the second arrangement example. As illustrated in FIG. 27 and FIG. 28, after passing the coupling lens 22, light emitted from one of the light emission areas 211 included in the light source 21 converges toward the distance Px which is a formed position of the conjugate image of the light source 21. That is, an image of the detection light Li is formed at the distance Px.

Figure 29:
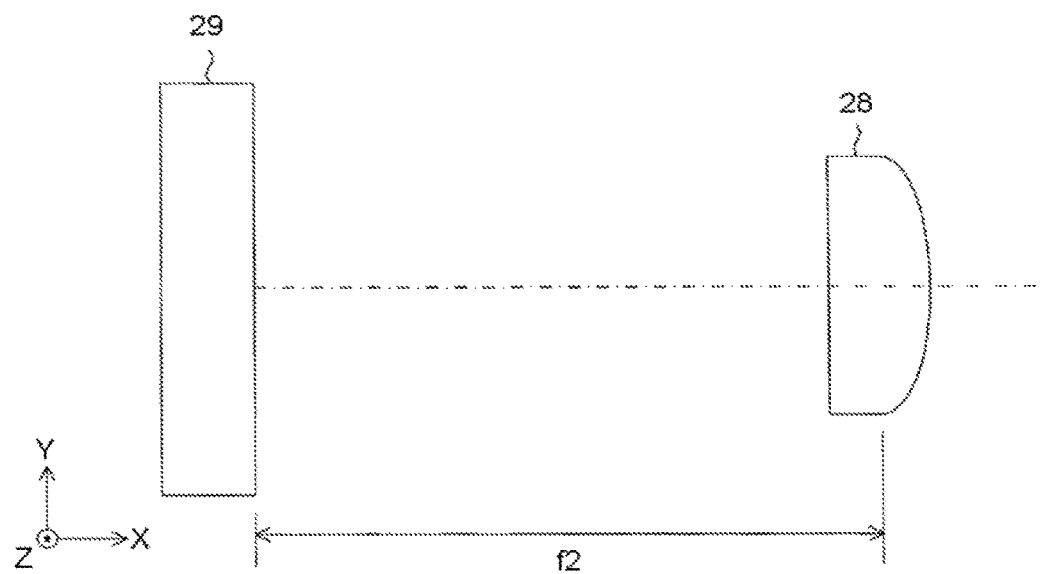
FIG. 29 is an optical arrangement view illustrating an example of a positional relationship between the imaging forming lens and the photodetector in the second arrangement example.

Next, a different example of an optical arrangement of the imaging forming lens 28 and the photodetector 29 included in the light detecting system 202 will be described. FIG. 29 is an optical arrangement view illustrating an arrangement example of the imaging forming lens 28 and the photodetector 29 in the second arrangement example. As illustrated in FIG. 29, the imaging forming lens 28 is arranged in the +X direction of the photodetector 29 and a distance thereto is identical to the focal length (f2) of the imaging forming lens 28. That is, when seen from the imaging forming lens 28, the photodetector 29 is arranged at a position which is away therefrom by a distance corresponding to the focal length (f2).

Figure 30:
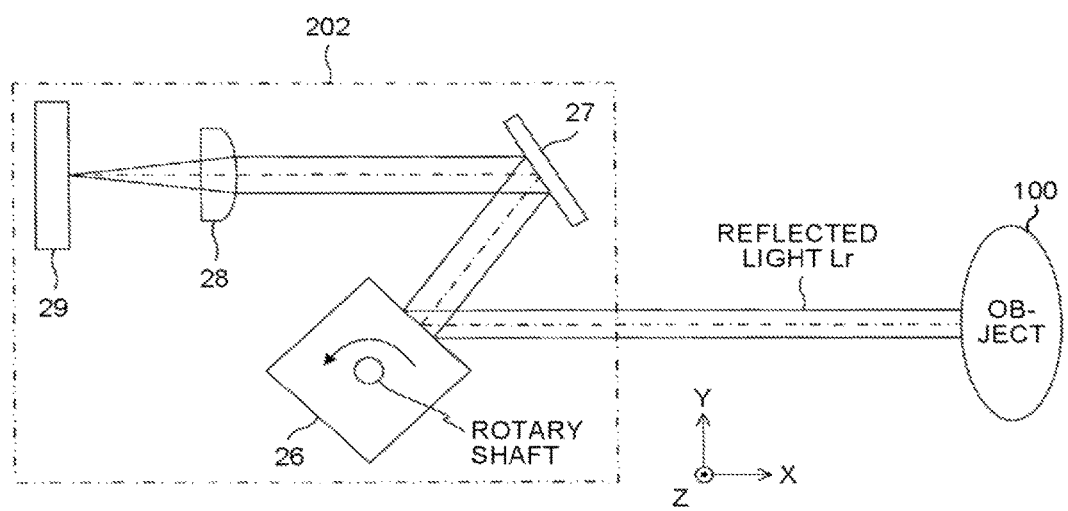
FIG. 30 is a view of an optical path on the YX plane illustrating an example of an optical path of reflected light in the second arrangement example.
Figure 31:
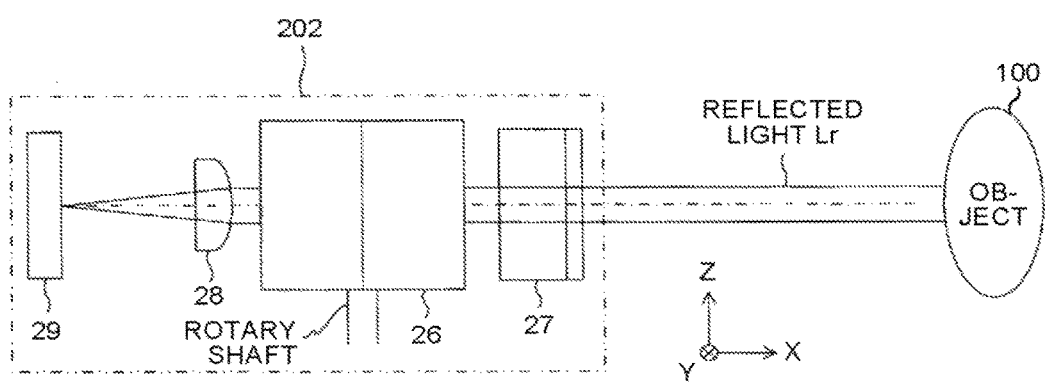
FIG. 31 is a view of an optical path on the ZX plane illustrating an example of the optical path of the reflected light in the second arrangement example.

FIG. 30 is a view of an optical path illustrating an example of an optical path of the reflected light Lr on the YX plane in the second arrangement example. FIG. 31 is a view of an optical path illustrating an example of an optical path of the reflected light Lr on the ZX plane in the second arrangement example. As illustrated in FIG. 30 and FIG. 31, the reflected light Lr from the object 100 is reflected by the second rotary mirror 26 and the second reflection mirror 27 and passes the imaging forming lens 28, and then, an image thereof is formed on the photodetector 29.

According to the second arrangement example described above, the conjugate image of the light source 21 is formed near the laser radar 20 and the conjugate image of the photodetector 29 is formed at infinity.

Figure 32:
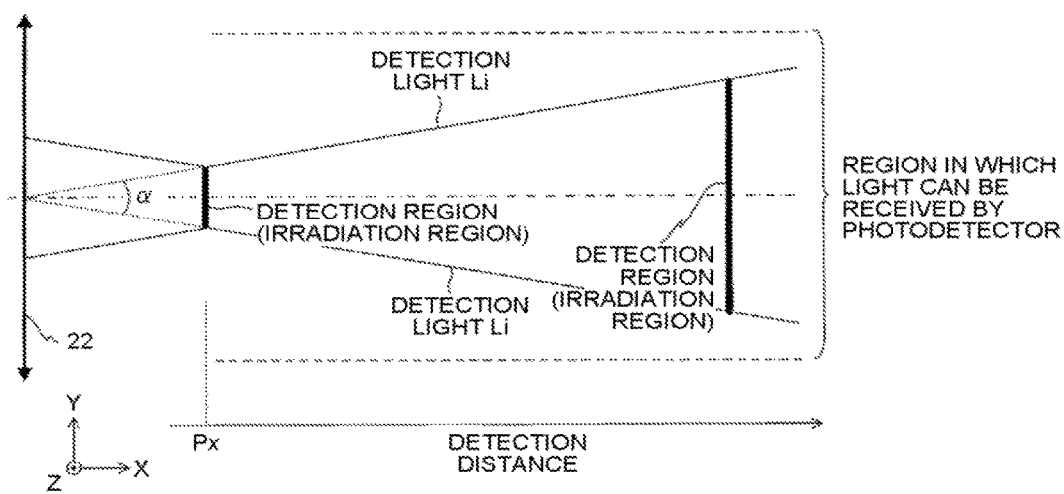
FIG. 32 is a view for describing a relationship on the YX plane between an irradiation region and a detection region in the second arrangement example.

FIG. 32 is a view illustrating a relationship between an irradiation region and a detection region on the YX plane in the second arrangement example. As illustrated in FIG. 32, in the second arrangement example, all pieces of the reflected light Lr from the object 100 can be received in the photodetector 29. That is, in the second arrangement example, the irradiation region and the detection region are identical to each other.

A size of the detection region in the second arrangement example is the same with a size of the detection region in the first arrangement example. That is, also in the second arrangement example, an effect equivalent to that of the above described first arrangement example can be acquired.

In other words, a region in which the object 100 can be detected is a region in which an image of the light source 21 (hereinafter, also referred to as "light source image") and an image of the photodetector 29 (hereinafter, also referred to as "detector image") overlaps with each other. Thus, as described in the first arrangement example, even when a position of the object 100 is within the region of the light source image, the reflected light Lr from the object 100 is not lead to the photodetector 29 when the position of the object 100 is outside the region of the detector image. In this case, the object 100 is not detected.

On the other hand, such as a case of the second arrangement example, even when a position of the object 100 is within the region of the detector image, light (detection light Li) emitted from the light source 21 is not emitted to the object 100 when the object 100 is outside the region of the light source image. In this case, the reflected light Lr from the object 100 is not generated. Thus, there is no light detectable in the photodetector 29.

First Spatial Information Acquiring Method

Figure 33:
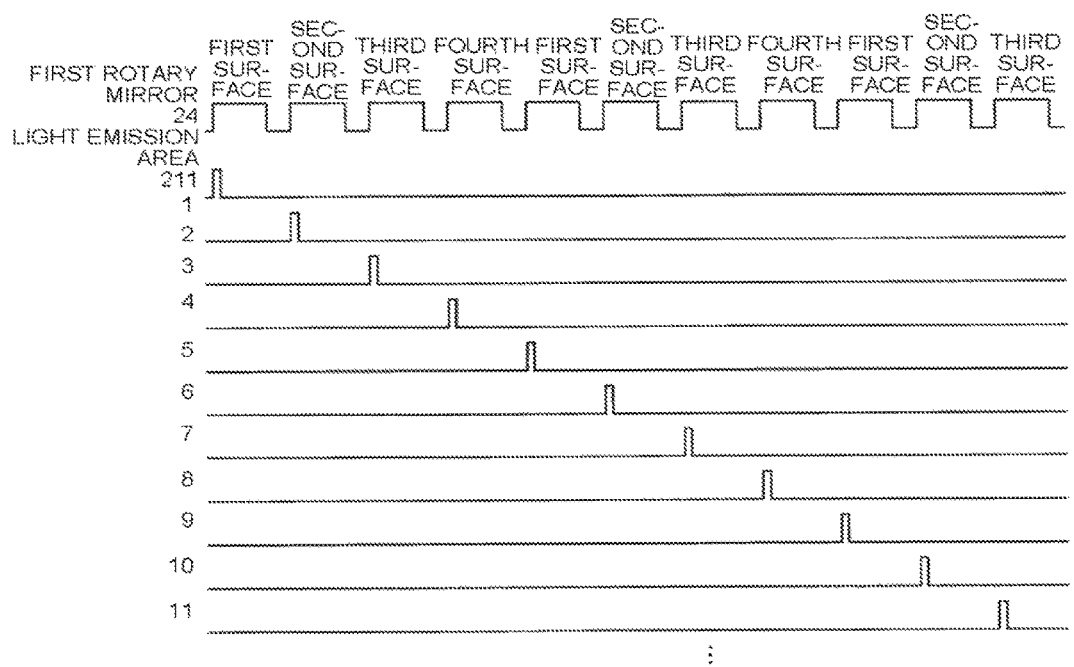
FIG. 33 is a timing chart illustrating a relationship between light emission timing in a light emission area and rotation timing of a first rotary mirror which are included in the laser radar.

Next, a method to acquire spatial information by using the laser radar 20 will be described. As described, the light source 21 of the laser radar 20 includes the plurality of light emission areas 211. FIG. 33 is a timing chart illustrating a relationship between light emission timing of the light emission areas 211 and rotation timing of the first rotary mirror 24. The laser radar 20 acquires, with the detection light Li emitted from one of the reflection surfaces of the first rotary mirror 24, object information in a scanning range in an arbitrary region divided in the vertical direction (Z-axis direction).

That is, control of pulse-lighting of the light emission areas 211 is executed by the object information acquiring unit 203. Also, rotation control of the first rotary mirror 24 is executed by the object information acquiring unit 203. By the pulse-lighting of the light emission areas 211, the detection light Li is emitted. That is, within a period of time in which scanning is performed with the detection light Li by one of the reflection surfaces of the first rotary mirror 24, one of the 28 light emission areas 211 is pulse-lighted. In other words, the object information acquiring unit 203 determines which light emission area 211 to be lighted according to the rotation of the first rotary mirror 24. With the detection light Li, object information is acquired.

When the scanning time by the one reflection surface of the first rotary mirror 24 is over, the object information acquiring unit 203 gives a lighting instruction on a next light emission area 211. Light emitted from the light emission area 211 according to the lighting instruction is used for scanning by a next reflection surface of the previous reflection surface of the first rotary mirror 24 and becomes the detection light Li. Similarly to the previous stage, with the detection light Li, object information in the scanning range is acquired.

As described above, positions of the light emission areas 211 lighted according to rotation timing of the first rotary mirror 24 are different in the vertical direction (Z-axis direction). In other words, in the light source 21 configured as the array light source, the plurality of light emission areas 211 is arrayed in a direction (Z-axis direction) different from the Y-axis direction which is the first direction. Lighting timing of each of the light emission areas 211 is determined according to a detection region.

As described above, by repeating processing of lighting different light emission areas 211 according to rotation timing of the first rotary mirror 24, the laser radar 20 executes detection processing of object information in a whole visual field region.

The number of reflection surfaces of the first rotary mirror 24 is four. Thus, until the laser radar 20 acquires object information of the whole visual field region, the first rotary mirror 24 is rotated, at least, for seven times.

Second Spatial Information Acquiring Method

Here, a case of acquiring and updating information of the whole visual field region at every 21 ms will be considered. By rotating the first rotary mirror 24 for seven times, one piece of object information can be acquired. Thus, the laser radar 20 cannot acquire the object information unless the first rotary mirror 24 is rotated at 20000 rpm (1÷(21 ms÷7÷1000÷60)). However, 20000 rpm is a significant number of rotations. Thus, when the first rotary mirror 24 is rotated at 20000 rpm, various problems are generated. For example, an operation of the laser radar 20 becomes unstable and power consumption becomes large.

Thus, in the laser radar 20, object information acquiring processing to scan the whole visual field region is executed not in a scanning range of the plurality of reflection surfaces included in the first rotary mirror 24 but in that of one reflection surface among the plurality of reflection surfaces included in the first rotary mirror 24. In other words, the laser radar 20 executes the object information acquiring processing in a scanning region defined by a scanning angle φ by one of the reflection surfaces of the first rotary mirror 24. The number of rotations of the first rotary mirror 24 in this case only needs to be 714.3 rpm (1÷(21 ms×4÷1000÷60)).

Thus, when processing of acquiring object information of the whole visual field region can be executed by scanning by one reflection surface of the first rotary mirror 24, the number of rotations of the first rotary mirror 24 can be very small.

For example, when resolution in the scanning direction (Y-axis direction) of the laser radar 20 is 0.24°, the object information acquiring processing in the whole visual field region is executed while one reflection of the first rotary mirror 24 rotates by 0.24°. That is, a range (scanning angle φ) scanned by one reflection surface of the first rotary mirror 24 is set as a rotation angle of the first rotary mirror 24 and is divided by 0.24°. That is, a range scanned by one reflection surface is divided into a plurality of regions (scanning regions). Within one of the divided plurality of regions (0.24°), a light emission area 211 to project the detection light Li is switched. Note that a period of time in which one mirror surface of the first rotary mirror 24 rotates by 0.24° is 28 μs (21 ms×(0.24°/180°)).

A period of time which is "28 μs" being divided by the number of light emission areas 211 is set as a delay time. The delay time of this case is 1 μs (28 μs÷28). While the first rotary mirror 24 rotates for 0.24° with the delay time as 1 μs, the light emission areas 211 are pulse-lighted serially from the top. That is, in a period of time (28 μs) in which the first rotary mirror 24 rotates by 0.24°, the light emission areas 211 are pulse-lighted while being switched serially from A (1) to A (28) every 1 μs. By performing such processing, the detection region can be scanned with the detection light Li. When scanning of the detection region is performed by lighting the light emission areas 211 serially from A (1) to A (28) in the period of time in which the first rotary mirror 24 rotates for 0.24°, all pieces of object information in the vertical direction (Z-axis direction) included in the visual field region can be acquired.

Figure 34:
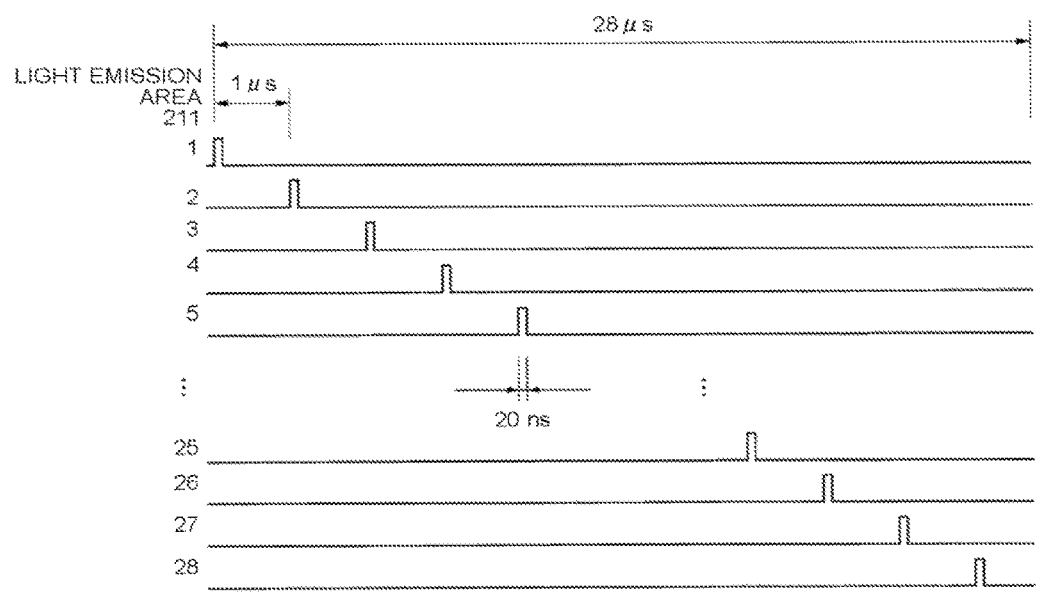
FIG. 34 is a timing chart illustrating a relationship between the light emission timing of the light emission area and a scanning time around one reflection surface of the first rotary mirror.

Here, a period of time, in which one of the light emission areas 211 included in the light source 21 is pulse-lighted, is about 20 ns. FIG. 34 is a timing chart illustrating a relationship between a scanning time around one reflection surface of the first rotary mirror 24 and light emission timing of the light emission areas 211. As illustrated in FIG. 34, when object detection processing in the whole visual field region is executed in a scanning time of one reflection surface of the first rotary mirror 24, a lighting time of one light emission area 211 is 20 ns. That is, a period of time until the next light emission area 211 is lighted is 980 ns (1 μs-20 ns).

Thus, according to a spatial information acquiring method executed in the laser radar 20, it is not necessary to consider a problem of thermal/electrical crosstalk.

Object Information Acquiring Processing

Figure 35:
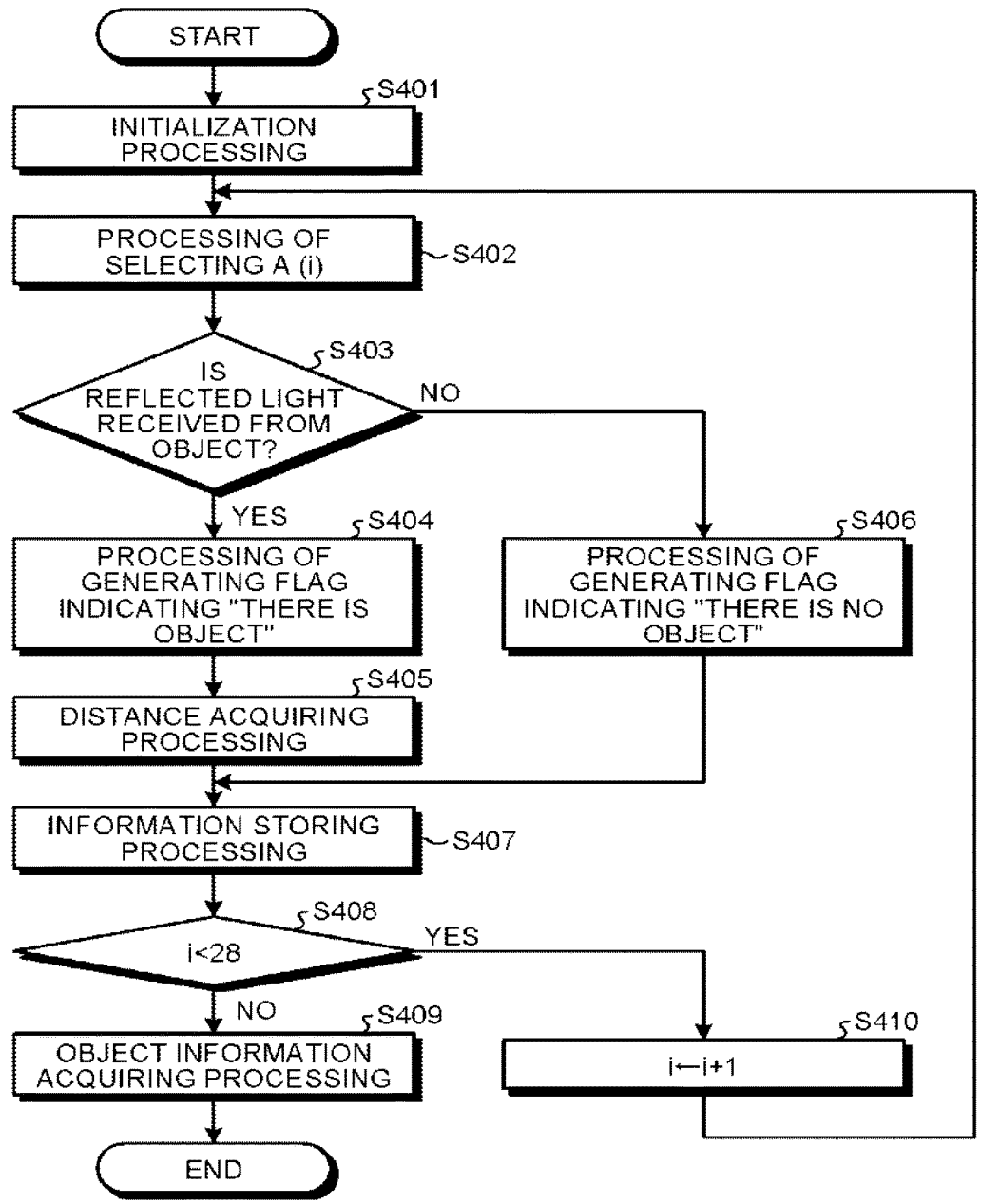
FIG. 35 is a flowchart illustrating a flow of object information acquiring processing executed by an object information acquiring unit included in the laser radar.

Next, object information acquiring processing executed in the laser radar 20 will be described. FIG. 35 is a flowchart illustrating an example of a flow of the object information acquiring processing executed by the object information acquiring unit 203. As illustrated in FIG. 35, processing steps will be referred to as S401, S402, and the like.

The object information acquiring processing described in the following is repeatedly executed by the object information acquiring unit 203 at every predetermined timing (such as every 21 ms) until an operation power source of the laser radar 20 is turned off.

First, in the object information acquiring unit 203, initialization processing of a variable i for specifying a light emission area 211 is executed (S401). In the initialization processing, a value "1" is set as the variable i.

Next, in the object information acquiring unit 203, processing to select a light emission area 211 corresponding to the variable i is executed (S402). Here, a light emission area 211 corresponding to A (i) is selected and lighted, and the detection light Li is emitted.

Next, in the object information acquiring unit 203, processing to determine whether the reflected light Lr from the object 100 is received within a predetermined period of time is executed (S403). Note that the "predetermined period of time" is, for example, 2 μs. However, the "predetermined period of time" is not limited to 2 μs.

In the object information acquiring unit 203, when it is determined that the reflected light Lr from the object 100 is received within the predetermined period of time (YES in S403), flag information indicating that "there is an object" is generated (S404).

Next, in the object information acquiring unit 203, distance acquiring processing to acquire a distance to the object 100 is executed (S405). The distance acquiring processing (S405) is processing to calculate a distance to the object 100 in the object information acquiring unit 203 based on lighting timing of the light source 21 (timing of emitting detection light Li from light source 21) and timing of receiving the reflected light Lr in the photodetector 29.

In the object information acquiring unit 203, when it is determined that the reflected light Lr from the object 100 is not received in the predetermined period of time (NO in S403), flag information indicating that "there is no object" is generated (S406).

Next, information storing processing to associate a value of the variable i, a flag indicating presence/absence of the object 100, a calculated distance to the object 100, and detection time with each other and to store the associated information into a storage unit (not illustrated) included in the object information acquiring unit 203 is executed (S407).

Next, determination processing to determine whether the variable i has reached an upper limit is executed (S408). When the value of the variable i is smaller than 28 (YES in S408), adding processing to the variable i is executed (S410) and processing goes back to S402. Hereinafter, until the determination in S408 is affirmed, the processing of S402 to S408 is repeatedly executed.

When the value of the variable i is equal to or larger than 28 (NO in S408), processing goes to the object information acquiring processing (S409).

The object information acquiring processing (S409) is processing to acquire object information based on the information stored into the storage unit of the object information acquiring unit 203. In the object information acquiring unit 203, when presence/absence of the object 100 and a distance to the object 100, in respect to the whole visual field region, which are stored in the storage unit are read and when there is the object 100, object information such as a position of the object 100, a size of the object 100, and a shape of the object 100 is acquired. The acquired object information is stored into the memory 50 with the detection time.

As described above, in the object information acquiring unit 203, the object information acquiring processing is executed.

Also, the monitoring apparatus 10 which is a sensing apparatus includes the main control apparatus 40, the memory 50, and the sound/alarm generation apparatus 60.

As described above, the laser radar 20 includes the light emitting system 201, the light detecting system 202, the object information acquiring unit 203, and the like.

The light emitting system 201 includes the light source 21, the coupling lens 22, the first reflection mirror 23, the first rotary mirror 24, and the like. The light detecting system 202 includes the second rotary mirror 26, the second reflection mirror 27, the imaging forming lens 28, the photodetector 29, and the like.

The light source 21 includes the plurality of light emission areas 211 arranged at regular intervals in the Z-axis direction. Each of the light emission areas 211 includes the plurality of light emission units 2111 arranged two-dimensionally. In such a manner, by forming each of the light emission areas 211 by integrating the plurality of light emission units 2111, intensity of the detection light Li emitted from the light emitting system 201 can be increased. Thus, according to the laser radar 20, it is possible to make a detectable distance to the object 100 longer.

Also, according to a detection region divided in the vertical direction (Z-axis direction), the object information acquiring unit 203 determines a light emission area 211 to be lighted. That is, according to an emitting direction of the detection light Li on the ZX plane, the object information acquiring unit 203 determines a light emission area 211 to be lighted among the plurality of light emission areas 211. Thus, according to the laser radar 20, the number of times of division of detection in the vertical direction (Z-axis direction) can be improved, and at the same time, duration of the light source 21 can be made longer.

Also, based on lighting timing of the light source 21 and light receiving timing in the photodetector 29, the object information acquiring unit 203 acquires a distance to the object 100 for each of the detection regions divided in the vertical direction (Z-axis direction). Moreover, the object information acquiring unit 203 acquires object information based on a distance to the object 100 in each of the detection regions divided in the vertical direction (Z-axis direction). Thus, according to the laser radar 20, object information can be acquired accurately.

Also, the object information acquiring unit 203 can acquire a distance to the object 100 in each emitting direction of the detection light Li emitted to each of the detection regions divided in the vertical direction (Z-axis direction) and can acquire a shape of the object 100.

Also, since the monitoring apparatus 10 includes the laser radar 20, object information and movement information can be calculated accurately.

Note that in the above described embodiment, a case where the light emitting system 201 is arranged on the +Z side of the light detecting system 202 has been described but the present invention is not limited thereto.

Also, in the above described embodiment, a case where a shape of each of the light emission areas 211 is a square has been described but the present invention is not limited thereto.

Also, in the above described embodiment, a case where a shape of each of the light emission units 2111 is a square has been described but the present invention is not limited thereto.

Also, in the above described embodiment, a case where each of the first rotary mirror 24 and the second rotary mirror 26 includes four reflection surfaces has been described but the present invention is not limited thereto.

Also, in the above described embodiment, a rotation mechanism to make the laser radar 20 rotate around the Z-axis may be included.

Also, in the above described embodiment, positions of the coupling lens 22 and the imaging forming lens 28 are not limited to the positions illustrated in the first arrangement example and the second arrangement example.

Also, in the above described embodiment, a configuration of the light source 21 is not limited to a configuration example illustrated in each of the first arrangement example and the second arrangement example.

Also, in the above described embodiment, a case where the light source 21 includes 28 light emission areas 211 has been described but the present invention is not limited thereto. The number of light emission areas 211 only needs to be determined according to a requested size of a detection region in the Z-axis direction.

Also, in the above described embodiment, a case where 250 light emission units 2111 are arrayed in the Y-axis direction and 250 light emission units 2111 are arrayed in the Z-axis direction in one light emission area 211 has been described but the present invention is not limited thereto.

Also, in the above described embodiment, a case where the number of light emission units 2111 in the Y-axis direction and the number of light emission units 2111 in the Z-axis direction are identical to each other in each of the light emission areas 211 has been described but the present invention is not limited thereto.

Also, in the above described embodiment, a case where the plurality of light emission units 2111 is arrayed two-dimensionally in each of the light emission areas 211 has been described but the present invention is not limited thereto. The plurality of light emission units 2111 may be arrayed either in the Y-axis direction and the Z-axis direction.

Also, in the above described embodiment, a case where d2 is about 0.02 mm, d3 is about 0.7 μm, and d4 is about 1 μm has been described but the present invention is not limited thereto.

Also, in the above described embodiment, the focal length (f1) of the coupling lens 22 and the focal length (f2) of the imaging forming lens 28 may be identical to each other. In this case, the coupling lens 22 and the imaging forming lens 28 can be commonalized and a cost can be reduced.

Also, in the above described embodiment, a part of the processing executed in the object information acquiring unit 203 can be executed in the main control apparatus 40. Also, a part of the processing executed in the main control apparatus 40 may be executed in the object information acquiring unit 203.

Also, in the above described embodiment, as illustrated in FIG. 37 and FIG. 38, the first rotary mirror 24 and the second rotary mirror 26 may be integrated.

Also, in the above described embodiment, a case where the monitoring apparatus 10 includes one laser radar 20 has been described but the present invention is not limited thereto. A plurality of laser radars 20 may be included according to a size of the vehicle 1 and a monitored region.

Also, in the above described embodiment, a case where the laser radar 20 is used in the monitoring apparatus 10 to monitor a moving direction of the vehicle 1 has been described but the present invention is not limited thereto. For example, the laser radar 20 may be used in an apparatus to monitor a backside or a side of the vehicle 1.

Moreover, the laser radar 20 may also be used in a sensing apparatus other than that for a vehicle. In this case, the main control apparatus 40 outputs alarm information corresponding to a purpose of the sensing.

Also, the laser radar 20 may be used only to detect presence/absence of the object 100.

Also, the laser radar 20 may be used for a purpose other than a sensing apparatus (such as distance measuring apparatus or shape measuring apparatus).

According to the present invention, it is possible to divide a visual field region in an up-down direction (vertical direction) and to improve resolution of the detection region.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An object detecting apparatus comprising:
   a light projector that includes
      an array light source in which each of a plurality of light emission areas emits light; and
      a coupling lens that couples light emitted from the light emission areas;
   an optical scanner that performs scanning with the light, which is emitted from the light projector, in a first direction;
   a light receiver that includes a photodetector and an imaging forming lens and receives reflected light, with which scanning is performed, being reflected by an object, the coupling lens being arranged at a position which is away from the array light source by a distance corresponding to a focal length of the coupling lens when seen from the array light source, the photodetector being arranged at a position farther than a focal length of the imaging forming lens when seen from the imaging forming lens; and
   a processor to detect a presence/absence of the object based on emission timing at which the light is emitted from the light projector and light receiving timing at which the light receiver receives the reflected light.

2. The object detecting apparatus according to claim 1, wherein a formed position of a conjugate image of the photodetector by the imaging forming lens is set as the shortest detection distance.

3. The object detecting apparatus according to claim 1, wherein
   the light emission areas are arrayed in a direction different from the first direction, and
   the processor determines a light emission area to be lighted among the plurality of light emission areas according to a detection region by the light used for the scanning.

4. The object detecting apparatus according to claim 1, wherein each of the light emission areas is an aggregation of a plurality of light emission units.

5. The object detecting apparatus according to claim 1, wherein
   the optical scanner is a polygon mirror including a plurality of reflection surfaces, and
   light emitted from the different light emission areas are respectively projected on the reflection surfaces.

6. The object detecting apparatus according to claim 1, wherein
   the optical scanner is a polygon mirror including a plurality of reflection surfaces, and
   light emitted from the different light emission areas are projected on one of the reflection surfaces while the one reflection surface performs scanning.

7. The object detecting apparatus according to claim 6, wherein
   a range scanned by the one reflection surface is divided into a plurality of regions, and
   the light emission areas to project the light are switched in one of the plurality of regions.

8. The object detecting apparatus according to claim 1, wherein when detecting the object, the processor calculates a distance to the object based on emission timing at which the light is emitted from the light projector and light receiving timing at which the light receiver receives the reflected light.

9. The object detecting apparatus according to claim 8, wherein the processor acquires a shape of the object based on a distance to the object in each emitting direction of the light emitted from the optical scanner.

10. An object detecting apparatus comprising:
    a light projector that includes
       an array light source in which each of a plurality of light emission areas emits light; and
       a coupling lens that couples light emitted from the light emission areas;
    an optical scanner that performs scanning with the light, which is emitted from the light projector, in a first direction;
    a light receiver that includes a photodetector and an imaging forming lens and receives reflected light, with which scanning is performed, being reflected by an object, the coupling lens being arranged at a position farther than a focal length of the coupling lens when seen from the array light source, the photodetector being arranged at a position which is away from the imaging forming lens by a distance corresponding to the focal length of the imaging forming lens when seen from the imaging forming lens; and
    a processor to detect a presence/absence of the object based on emission timing at which the light is emitted from the light projector and light receiving timing at which the light receiver receives the reflected light.

11. The object detecting apparatus according to claim 10, wherein
    the light emission areas are arrayed in a direction different from the first direction, and
    the processor determines a light emission area to be lighted among the plurality of light emission areas according to a detection region by the light used for the scanning.

12. The object detecting apparatus according to claim 10, wherein each of the light emission areas is an aggregation of a plurality of light emission units.

13. The object detecting apparatus according to claim 10, wherein
the optical scanner is a polygon mirror including a plurality of reflection surfaces, and
light emitted from the different light emission areas are respectively projected on the reflection surfaces.

14. The object detecting apparatus according to claim 10, wherein
the optical scanner is a polygon mirror including a plurality of reflection surfaces, and
light emitted from the different light emission areas are projected on one of the reflection surfaces while the one reflection surface performs scanning.

15. The object detecting apparatus according to claim 14, wherein
a range scanned by the one reflection surface is divided into a plurality of regions, and
the light emission areas to project the light are switched in one of the plurality of regions.

16. The object detecting apparatus according to claim 10, wherein when detecting the object, the processor calculates a distance to the object based on emission timing at which the light is emitted from the light projector and light receiving timing at which the light receiver receives the reflected light.

17. The object detecting apparatus according to claim 16, wherein the processor acquires a shape of the object based on a distance to the object in each emitting direction of the light emitted from the optical scanner.

* * * * *